United States Patent
Park et al.

(10) Patent No.: US 10,911,975 B2
(45) Date of Patent: *Feb. 2, 2021

(54) RRM REPORTING METHOD IN WIRELESS COMMUNICATION SYSTEM, AND APPARATUS SUPPORTING SAME

(71) Applicant: LG Electronics Inc., Seoul (KR)

(72) Inventors: Hanjun Park, Seoul (KR); Hyunsoo Ko, Seoul (KR); Eunsun Kim, Seoul (KR); Kijun Kim, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,968

(22) Filed: Mar. 10, 2020

(65) Prior Publication Data

US 2020/0213890 A1 Jul. 2, 2020

Related U.S. Application Data

(63) Continuation of application No. 16/065,740, filed as application No. PCT/KR2017/005673 on May 31, 2017, now Pat. No. 10,602,390.

(Continued)

(51) Int. Cl.
*H04W 24/10* (2009.01)
*H04L 5/00* (2006.01)
*H04W 56/00* (2009.01)
(Continued)

(52) U.S. Cl.
CPC ........... *H04W 24/10* (2013.01); *H04L 5/0051* (2013.01); *H04W 56/001* (2013.01);
(Continued)

(58) Field of Classification Search
CPC ............ H04W 24/10; H04W 72/0453; H04W 72/046; H04W 72/0406; H04W 72/0446;
(Continued)

(56) References Cited

U.S. PATENT DOCUMENTS 8,442,151 B2 * 5/2013 Lee .................. H04L 5/0051
375/299
2016/0013984 A1 * 1/2016 Sun .................. H04L 41/0866
370/252

(Continued)

FOREIGN PATENT DOCUMENTS

JP 2008530911 8/2008
JP 2015508961 3/2015
(Continued)

OTHER PUBLICATIONS

International Search Report and Written Opinion in International Application No. PCT/KR2017/005673, dated Sep. 26, 2017, 13 pages.

(Continued)

*Primary Examiner* — Afshawn M Towfighi
(74) *Attorney, Agent, or Firm* — Fish & Richardson P.C.

(57) ABSTRACT

The present invention discloses a method for a terminal reporting radio resource management (RRM) to a base station, and an apparatus supporting the same. More specifically, the present invention discloses a method for a terminal, if a base station transmits signals including an RRM reference signal (RS) by using one or more analogue beams for each symbol, performing RRM measurement in correspondence with the same, and reporting the measured RRM information; and an apparatus supporting the same.

10 Claims, 13 Drawing Sheets

Related U.S. Application Data

(60) Provisional application No. 62/377,523, filed on Aug. 19, 2016, provisional application No. 62/345,006, filed on Jun. 3, 2016, provisional application No. 62/343,176, filed on May 31, 2016.

(51) Int. Cl.
*H04W 72/04* (2009.01)
*H04W 80/02* (2009.01)

(52) U.S. Cl.
CPC ..... *H04W 72/0406* (2013.01); *H04W 72/046* (2013.01); *H04W 72/0446* (2013.01); *H04W 72/0453* (2013.01); *H04W 80/02* (2013.01)

(58) Field of Classification Search
CPC .... H04W 56/001; H04W 80/02; H04L 5/0051
See application file for complete search history.

(56) References Cited

U.S. PATENT DOCUMENTS

| | | | |
|---|---|---|---|
| 2016/0057720 A1* | 2/2016 | Kim | H04L 5/0048 370/350 |
| 2017/0164230 A1* | 6/2017 | You | H04B 17/336 |
| 2017/0195033 A1* | 7/2017 | Zhang | H04B 17/309 |
| 2017/0325260 A1* | 11/2017 | Guo | H04L 27/265 |
| 2018/0042000 A1* | 2/2018 | Zhang | H04W 72/042 |

FOREIGN PATENT DOCUMENTS

| | | |
|---|---|---|
| KR | 20100009463 | 1/2010 |
| KR | 20140123485 | 10/2014 |
| KR | 20150035759 | 4/2015 |
| WO | WO2006086576 | 8/2006 |
| WO | WO2016056761 | 4/2016 |

OTHER PUBLICATIONS

Nokia, Alcatel-Lucent Shanghai Bell, "Main components for forward compatible frame structure design in NR," 'R1-165029' 3GPP TSG-RAN WG1 #85, Nanjing, P.R. China, May 23-27, 2016, 5 pages.

Samsung, "Discussion on RS for beamformed access," 'R1-164014' 3GPP TSG RAN WG1 #85, Nanjing, China, May 23-27, 2016, 3 pages.

* cited by examiner

RRM REPORTING METHOD IN WIRELESS COMMUNICATION SYSTEM, AND APPARATUS SUPPORTING SAME

CROSS-REFERENCE TO RELATED APPLICATIONS

This application is a continuation of U.S. application Ser. No. 16/065,740, filed on Jun. 22, 2018, now allowed, which is a National Stage application under 35 U.S.C. § 371 of International Application No. PCT/KR2017/005673, filed on May 31, 2017, which claims the benefit of U.S. Provisional Application No. 62/377,523, filed on Aug. 19, 2016, U.S. Provisional Application No. 62/345,006, filed on Jun. 3, 2016, and U.S. Provisional Application No. 62/343,176, filed on May 31, 2016. The disclosures of the prior applications are incorporated by reference in their entirety.

TECHNICAL FIELD

The following description relates to a wireless communication system, and more particularly, to a method for reporting, by a terminal, radio resource management (RRM) to a base station in a wireless communication system and apparatuses supporting the same.

More specifically, the following description relates to a method for performing RRM measurement and reporting the measured RRM information by a terminal when a base station transmits a signal including an RRM reference signal (RS) by applying one or more analog beams on a symbol-by-symbol basis, and apparatuses supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY

An object of the present invention devised to solve the problem lies in a method and apparatus for reporting RRM to a base station.

In particular, it is an object of the present invention to provide a method for performing, by a terminal, RRM measurement usable for the signal transmission/reception operation and reporting the measured RRM to a base station in a case where signals are transmitted and received between the base station and the terminal (or user equipment) according to an analog beamforming technique, and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method and apparatus for reporting radio resource management (RRM) by a terminal in a wireless communication system.

In one aspect of the present invention, provided herein is a method for performing Radio Resource Management (RRM) reporting by a terminal in a wireless communication system, the method including receiving a signal transmitted by applying one or more analog beams thereto on a symbol-by-symbol basis, the signal including an RRM reference signal (RS), performing RRM measurement including at least one of received power measurement of the RRM RS and received power measurement of a signal received in a specific symbol, based on the received signal, and reporting measured RRM information to a base station.

In another aspect of the present invention, provided herein is a terminal for performing Radio Resource Management (RRM) reporting to a base station in a wireless communication system, the terminal (or user equipment) including a transmitter, a receiver, and a processor connected to the transmitter and the receiver, wherein the processor is configured to receive a signal transmitted by applying one or more analog beams thereto on a symbol-by-symbol basis, the signal including an RRM reference signal (RS), perform RRM measurement including at least one of received power measurement of the RRM RS and received power measurement of a signal received in a specific symbol, based on the received signal, and report measured RRM information to the base station.

The RRM RS may include one or more of a synchronization signal (SS) or a demodulation reference signal in a physical broadcast channel.

For example, the RRM RS may be transmitted in a frequency resource region of a predetermined size in a subframe in which a synchronization signal (SS) is transmitted, wherein a numerology identical to a numerology applied to the SS may be applied to the RRM RS.

In another example, the RRM RS may be transmitted in a frequency resource region of a predetermined size within a subframe after a predetermined number of subframes from a subframe in which a synchronization signal (SS) is transmitted.

In another example, the RRM RS may be transmitted in a frequency resource region of a predetermined size in a predetermined subframe, wherein a numerology configured by default may be applied to the RRM RS.

The RRM reporting method may further include receiving measurement configuration information from the base station. Herein, the RRM RS may be transmitted in a frequency resource region of a predetermined size indicated by the measurement configuration information in a subframe indicated by the measurement configuration information, wherein a numerology indicated by the measurement configuration information may be applied to the RRM RS.

In addition, the RRM RS may be generated by inserting, according to a numerology applied by the base station transmitting the RRM RS, one or more samples of zero between respective samples of an RRM RS sequence generated based on a numerology configured by default, wherein the terminal may receive the RRM RS based on the numerology configured by default.

Herein, the RRM RS may be transmitted through one or more antenna ports, wherein an independent analog beam may be applied to each of the one or more antenna ports.

In this case, a different frequency resource and sequence may be allocated to an RRM RS for each of the one or more antenna ports.

Alternatively, the terminal may measure received power of the RRM RS for each of the antenna ports to perform the received power measurement of the RRM RS.

In addition, when the RRM RS includes a plurality of types, the terminal may independently measure received power of each type of the RRM RS as the received power measurement of the RRM RS, or the terminal may measure RRM received power of a single value by applying a weight having a predetermined magnitude to the received power of each type of the RRM RS as the received power measurement of the RRM RS.

In addition, the terminal may measure received power for a signal received within the specific symbol for each of the one or more analog beams in the received power measurement of the signal received in the specific symbol.

The RRM reporting method may further include receiving, from the base station, instruction information instructing reporting of an aperiodic RRM measurement result. Herein, the terminal may report the measured RRM information to the base station through a physical layer signal or a Medium Access Control (MAC) layer signal after a predetermined time from a moment at which the instruction information is received.

In addition, when the RRM RS is transmitted through one or more antenna ports, the measured RRM information may include one of RRM measurement result information averaged over the one or more antenna ports, RRM measurement result information per antenna port for a certain number of analog beams of the one or more analog beams, and RRM measurement result information averaged over antenna ports for a certain number of analog beams of the one or more analog beams.

In addition, when the RRM RS is transmitted through one or more antenna ports, the terminal may perform the RRM measurement on one or more antenna ports satisfying a specific condition, wherein the measured RRM information may include identification information about the one or more antenna ports satisfying the specific condition.

The RRM reporting method may further include reporting, by the terminal, a maximum number of measurable RRM measurement targets to the base station, and receiving measurement configuration information from the base station. Herein, the RRM RS may be transmitted in a frequency resource region of a predetermined size indicated by the measurement configuration information in a subframe indicated by the measurement configuration information, wherein the terminal may perform the RRM measurement only on RRM measurement targets corresponding to the maximum number of measurable RRM measurement targets among RRM measurement targets indicated by an RRM measurement target list included in the measurement configuration information.

In addition, the signal transmitted by the base station may be transmitted by applying one or more independent analog beams for each symbol.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present invention, a base station may transmit a signal to a terminal by applying the analog beamforming technique. In particular, the base station may transmit a signal by applying one or more analog beams on a symbol-by-symbol basis.

In this case, according to the present invention, the terminal may efficiently measure the RRM for the signal transmitted using the analog beamforming technique and provide the information to the base station.

Thereby, the base station according to the present invention may implement an efficient analog beamforming method based on the information.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

DETAILED DESCRIPTION

Figure 1:
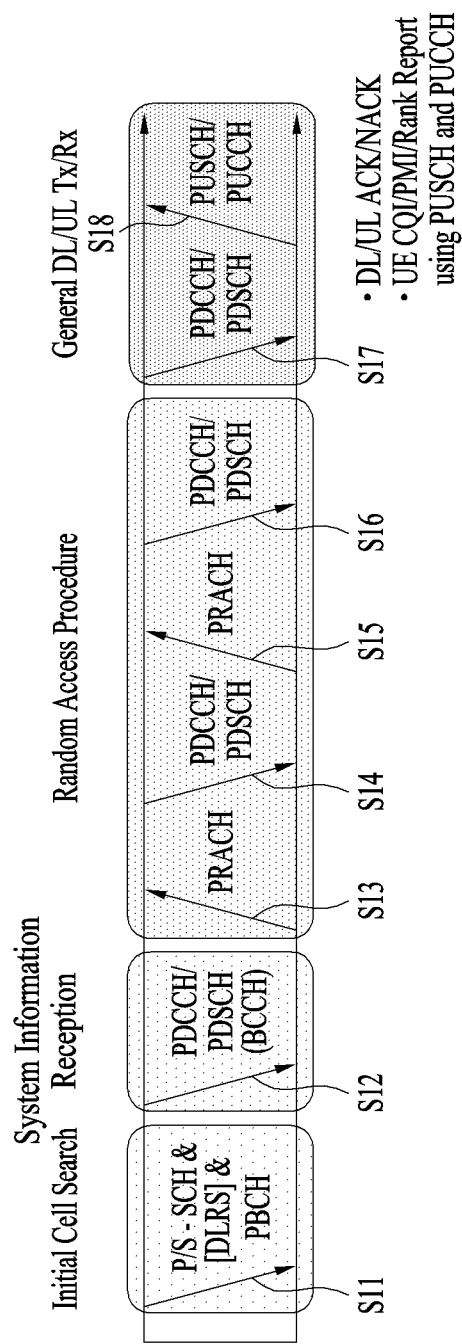
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2A:
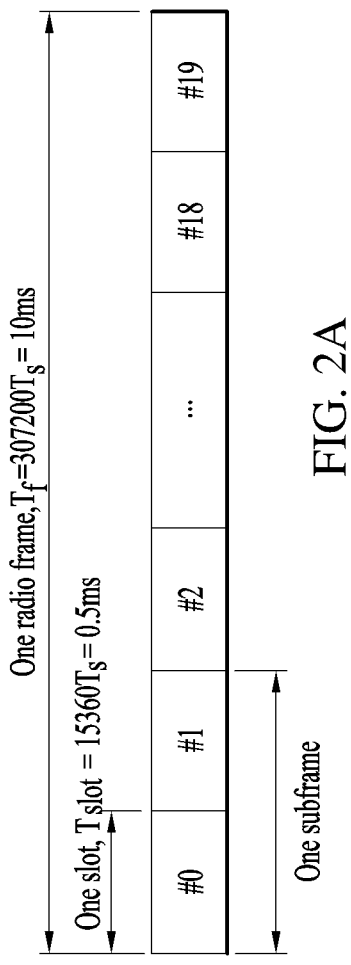
FIGS. 2A and 2B are diagrams illustrating exemplary radio frame structures.
Figure 2B:
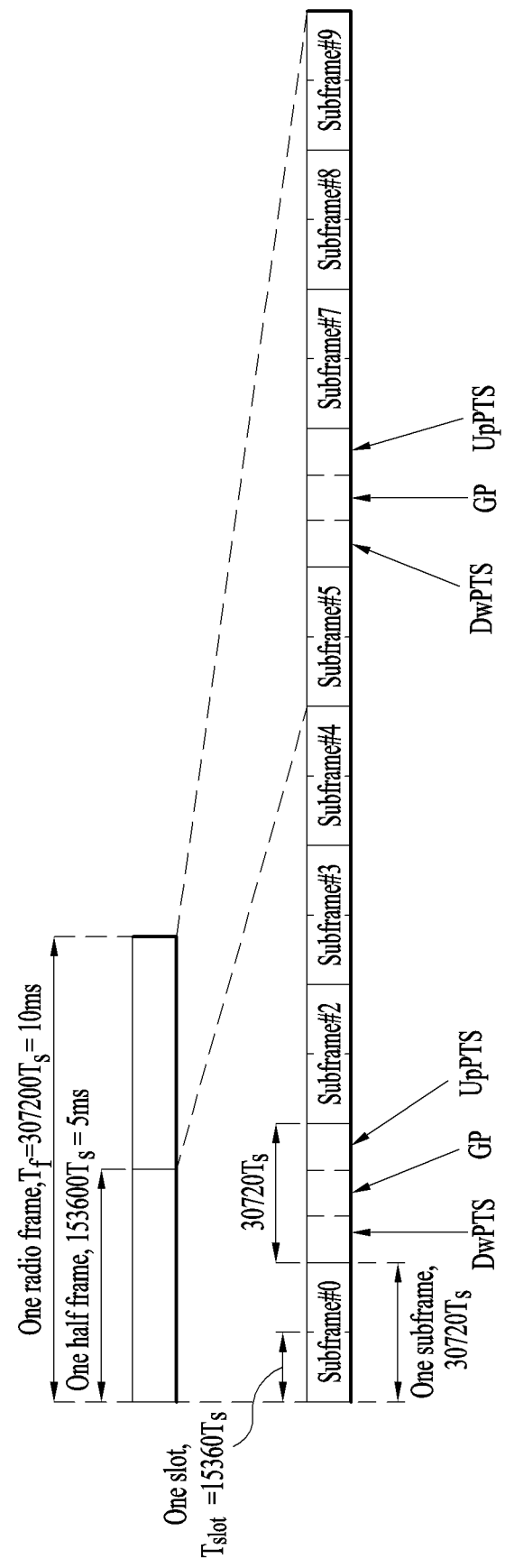

FIGS. 2A and 2B illustrate exemplary radio frame structures used in embodiments of the present disclosure.

FIG. 2A illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2B illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |

TABLE 1-continued

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 7 | $21952 \cdot T_s$ | — | — | — | — | — |
| 8 | $24144 \cdot T_s$ | — | — | — | — | — |

Figure 3:
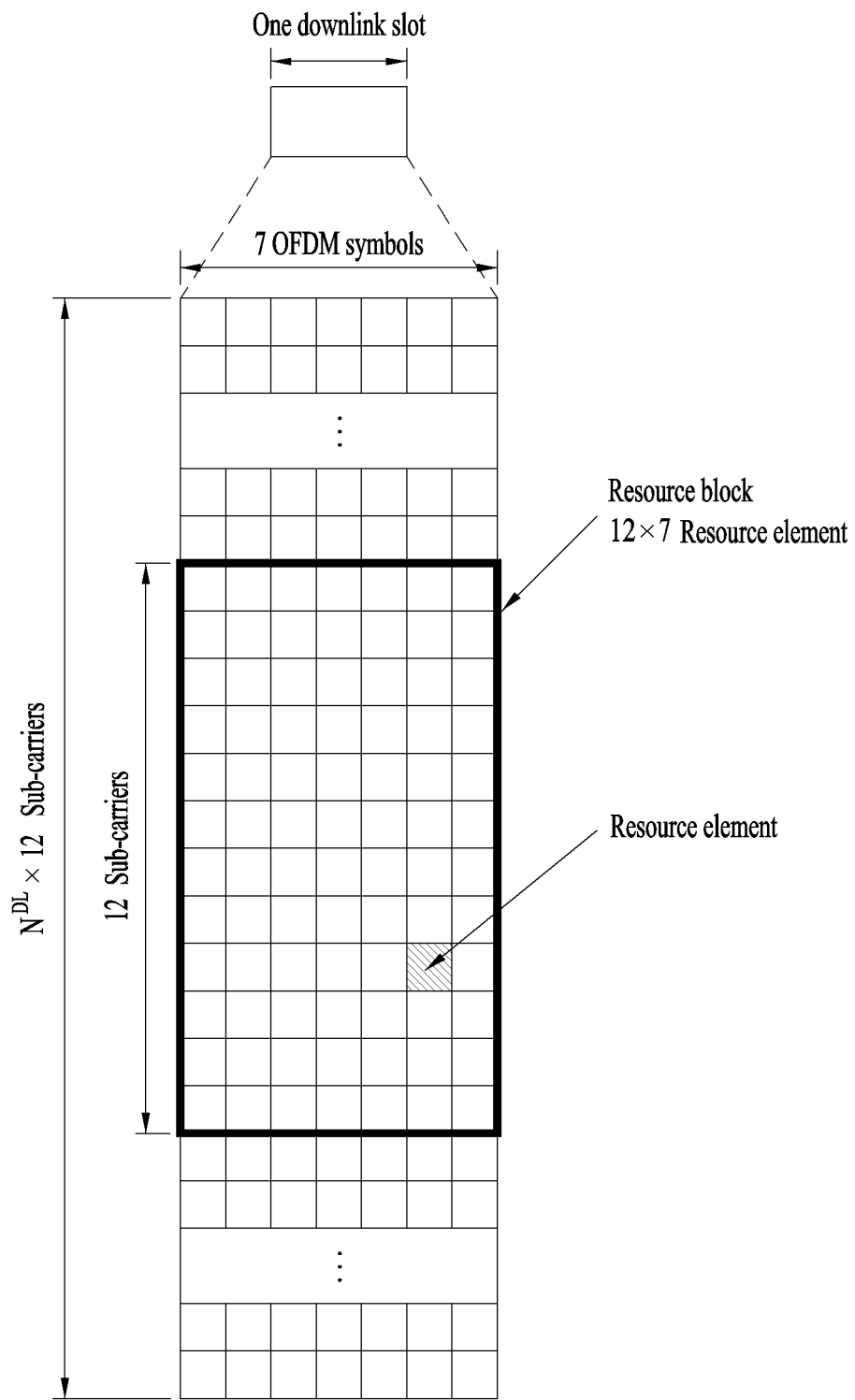
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
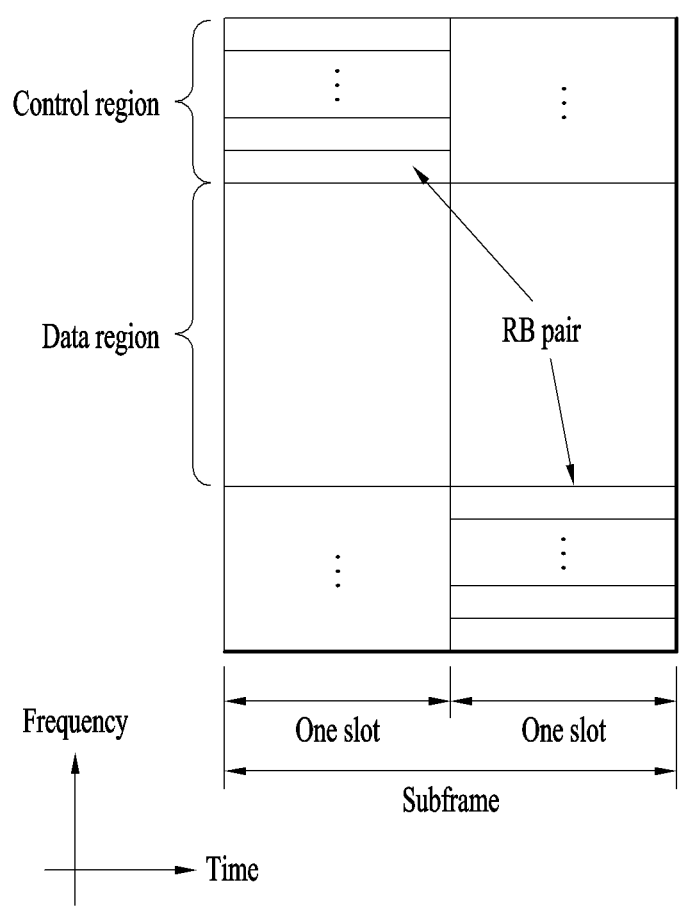
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
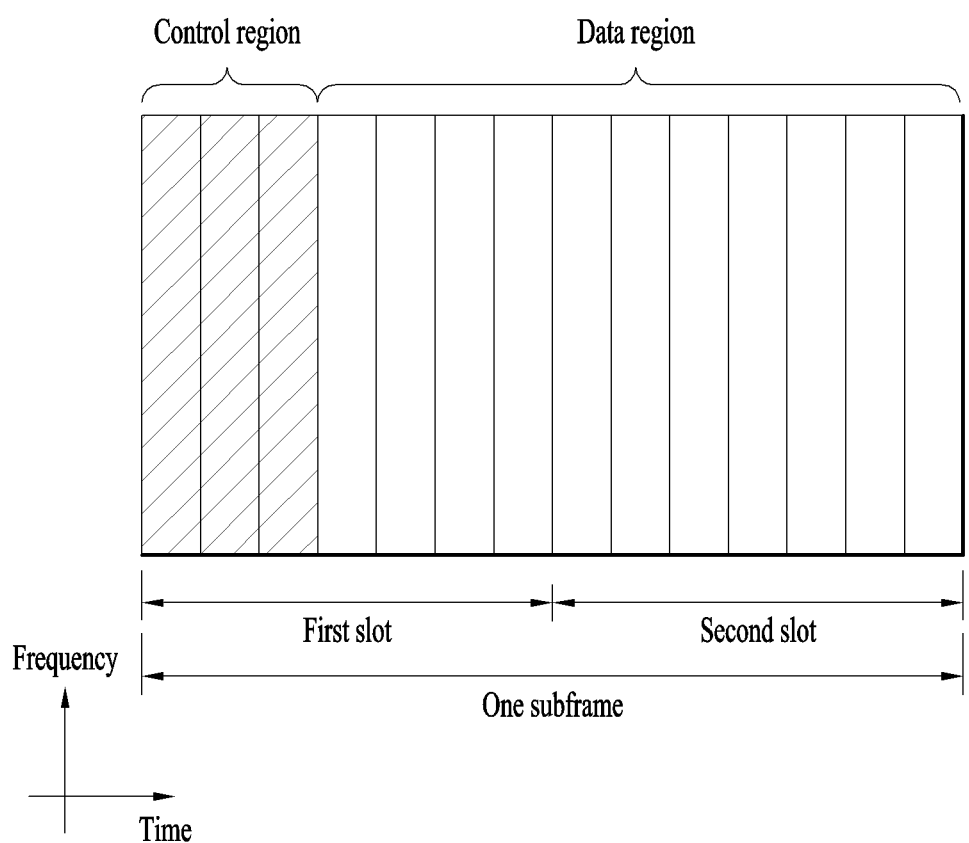
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

Thus, introduction of a new radio access technology considering enhanced mobile broadband communication, massive MTC, and Ultra-Reliable and Low Latency Communication (URLLC) is being discussed. In the present invention, for simplicity, this technology will be referred to as New RAT.

2.1. Self-Contained Subframe Structure

Figure 6:
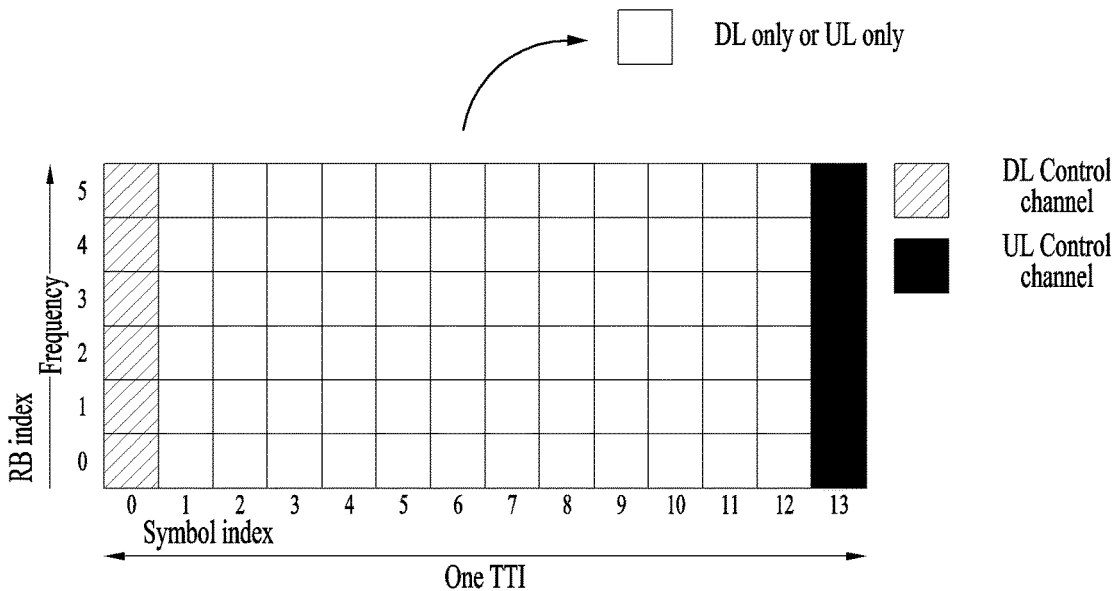
FIG. 6 is a diagram illustrating a self-contained subframe structure applicable to the present invention.

FIG. 6 is a diagram illustrating a self-contained subframe structure applicable to the present invention.

In the New RAT system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain time length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone as shown in FIG. 6.

For simplicity of explanation, the frame structure configured as above is referred to as a subframe, but this configuration can also be referred to as a frame or a slot. For example, in the New RAT system, one unit consisting of a plurality of symbols may be referred to as a slot. In the following description, a subframe or a frame may be replaced with the slot described above.

2.2. OFDM Numerology

The New RAT system uses the OFDM transmission scheme or a similar transmission scheme. Here, the New RAT system may typically have the OFDM numerology as shown in Table 2.

TABLE 2

| Parameter | Value |
| --- | --- |
| Subcarrier-spacing ($\Delta f$) | 75 kHz |
| OFDM symbol length | 13.33 μs |
| Cyclic Prefix(CP) length | 1.04 us/0.94 μs |
| System BW | 100 MHz |
| No. of available subcarriers | 1200 |
| Subframe length | 0.2 ms |
| Number of OFDM symbol per Subframe | 14 symbols |

Alternatively, the New RAT system may use the OFDM transmission scheme or a similar transmission scheme, and may use an OFDM numerology selected from among multiple OFDM numerologies as shown in Table 3. Specifically, as disclosed in Table 3, the New RAT system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the New RAT system according to the present invention, and the values thereof may vary depending on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the New RAT system according to the present invention, and the values thereof may vary depending on the implementation method.

TABLE 3

| Parameter | Value | Value | Value | Value |
| --- | --- | --- | --- | --- |
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
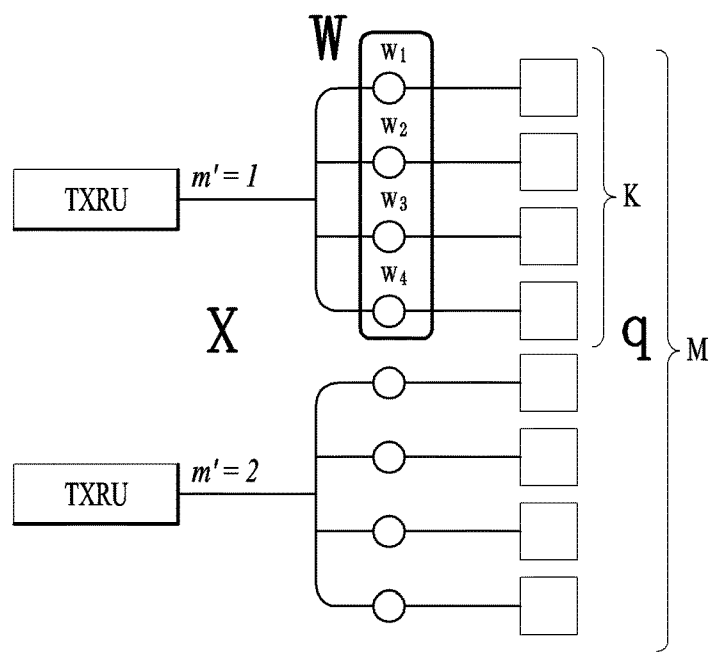
FIGS. 7 and 8 are diagrams illustrating representative methods for connecting TXRUs to antenna elements.
Figure 8:
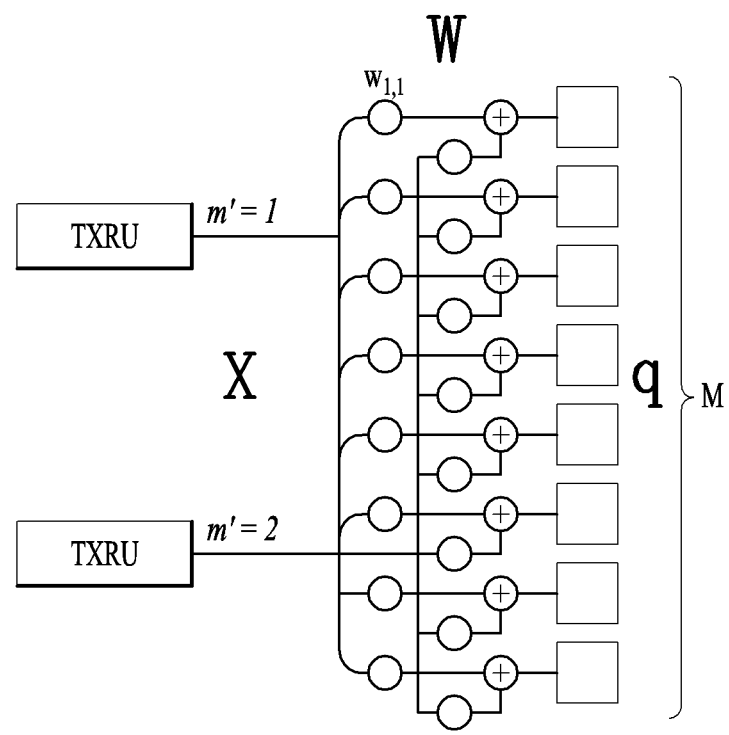

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

2.4. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

2.5. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement, and measure the RSRP or RSRQ according to the information of 'measConfig'.

Here, RSRP, RSRQ, and RSSI disclosed in the LTE system may be defined as follows.

First, reference signal received power (RSRP) is defined as the linear average over the power contributions (in [W]) of the resource elements that carry cell-specific reference signals within the considered measurement frequency bandwidth. For example, for RSRP determination the cell-specific reference signals $R_0$ shall be used. If the UE can reliably detect that $R_1$ is available it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE), which is transmitted on system information block type 3, in SIB3. Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

3. Proposed Embodiments

The present invention proposes a method for performing, by a UE, RRM measurement on a serving cell and a neighbor cell from which the UE is to receive data based on the RRM configuration of the LTE system when a BS implements analog beamforming which allows the base station to arbitrarily change a beam for transmitting a signal over time in a wireless communication system including the BS and the UE.

In the New RAT system described above, network slicing for implementing a plurality of logical networks on a single physical network is being discussed. The logical networks must be capable of supporting various types of services (e.g., Enhanced Mobile Broadband (eMBB), massive Machine Type Communication (mMTC), Ultra Reliable and Low Latency (URLLC), etc.).

In a wireless communication system (or the physical layer) of the New RAT system, a flexible structure capable of applying an OFDM scheme having a numerology suitable for a service to be provided is considered. In other words, in the New RAT system, an OFDM scheme (or a multiple access scheme) having different numerologies for respective time and frequency resource regions is considered.

In addition, as data traffic is rapidly increasing due to the recent introduction of smart devices, higher communication capacity (e.g., data throughput) is required in the New RAT system.

Thus, as a method to increase the communication capacity, performing data transmission using multiple transmit (or receive) antennas may be considered. In this case, applying digital beamforming to the multiple antennas requires an RF chain (e.g., a chain including RF devices such as a power amplifier and a down converter) and a D/A (or A/D) converter (i.e., a digital-to-analog or analog to digital converter), which may cause high hardware complexity and high power consumption, and therefore may not be practical.

Accordingly, when multiple antennas are used in a New RAT system to which the present invention is applicable, a hybrid beamforming technique of employing both digital beamforming and analog beamforming is considered. Herein, analog beamforming (or RF beamforming) refers to an operation of precoding (or combining) at the RF stage.

In the hybrid beamforming structure, precoding (or combining) is performed at the baseband stage and the RF stage, respectively, and therefore the number of RF chains and the number of D/A (or A/D) converters may be reduced, while achieving performance close to digital beamforming.

For simplicity of explanation, when the hybrid beamforming structure is represented by N transceiver units (TXRUs) and M physical antennas, digital beamforming for L data layers to be transmitted by the transmission end may be represented by an N*L matrix, and the N converted digital signals obtained thereafter may be converted into analog signals via the TXRUs and then subjected to analog beamforming, which is represented by an M*N matrix.

Figure 9:
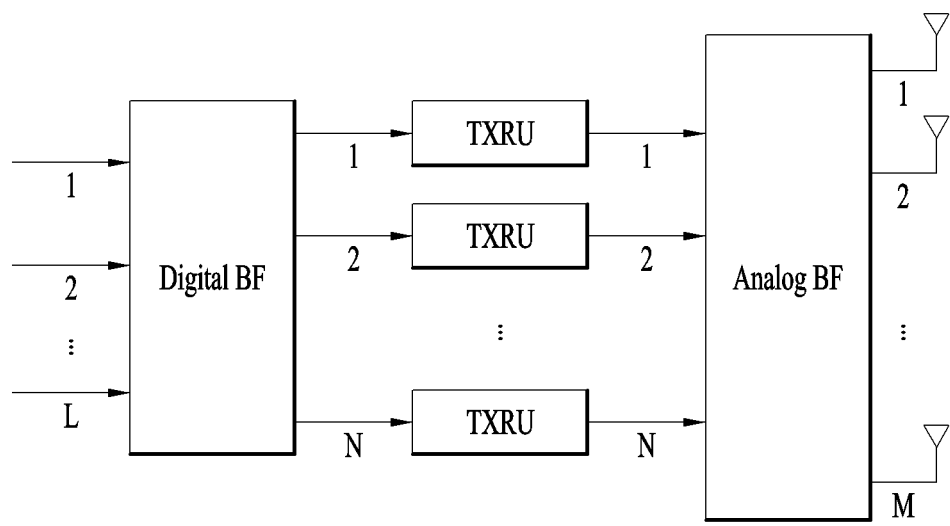
FIG. 9 is a diagram schematically illustrating a hybrid beamforming structure from the perspective of a TXRU and physical antennas.

FIG. 9 is a diagram schematically illustrating a hybrid beamforming structure from the perspective of a TXRU and physical antennas. In FIG. 9, the number of digital beams is L and the number of analog beams is N.

Further, in the New RAT system, a method for supporting more efficient beamforming for a UE located in a specific area by designing the base station so as to change the analog beamforming on a symbol-by-symbol basis is being considered. In this case, when the base station utilizes a plurality of analog beams as described above, the analog beams advantageous for signal reception may differ from UE to UE, and therefore the base station may transmit at least a synchronization signal, system information, paging, and the like through different analog beams on respective symbols in a specific subframe (SF). Thereby, all UEs may have an opportunity to receive the synchronization signal, the system information and the paging in the specific SF. Such an operation may be called beam sweeping.

Figure 10:
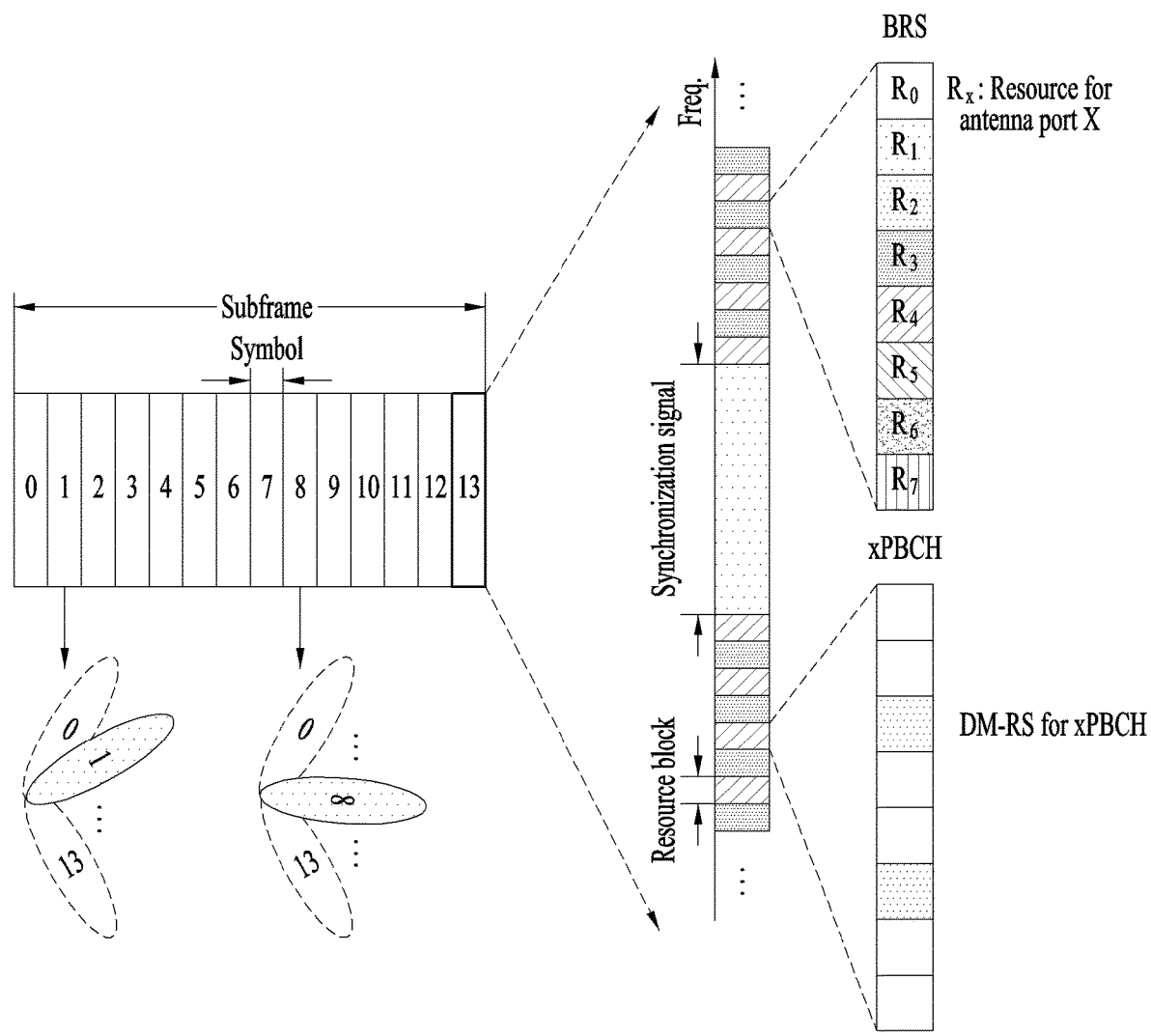
FIG. 10 is a diagram schematically illustrating a beam sweeping operation for a synchronization signal and system information in a downlink transmission procedure.

FIG. 10 is a diagram schematically illustrating a beam sweeping operation for a synchronization signal and system information in a downlink transmission procedure. For reference, in FIG. 10, a physical resource (or physical channel) on which the system information of the New RAT system is transmitted is called an xPBCH in order to be distinguished from the physical broadcast channel (PBCH) of the LTE system.

In FIG. 9, when N specific TXRUs and M RF antennas are defined as one antenna panel, a plurality of antenna panels to which independent hybrid beamforming is applicable may be employed in the New RAT system to which the present invention is applicable. In this case, there may be as many analog beams as the antenna panels in one symbol. For simplicity of explanation, analog beams capable of being simultaneously transmitted within one symbol (or one time unit) are referred to as an analog beam group.

Given such an analog beam group, a beam reference signal (BRS), which is a reference signal transmitted by applying each analog beam, may be considered as shown in FIG. 10. Through the BRS, the UE may measure channels for each analog beam.

At this time, unlike the BRS, the synchronization signal or the PBCH may be transmitted by applying all the analog beams in the analog beam group such that the synchronization signal or the PBCH may be well received by all UEs.

Similarly to the above case, channels need to be measured in the New RAT system for the purpose of RRM, and therefore it is necessary to define resources to form the basis of RRM measurement. Accordingly, the present invention proposes a method of RRM measurement in consideration of the analog beam group in the New RAT system. Hereinafter, as concepts corresponding to the RSRP, RSSI, and RSRQ of the LTE system, the average received power (per resource element) for a specific measurement resource for use in RRM measurement in the New RAT system is defined as xRSRP, the average received power considering all signals in a symbol is defined as xRSSI, and an index indicating the relative ratio between xRSRP and xRSSI is defined as xRSRQ (i.e., xRSRQ∝xRSRP/xRSSI).

Hereinafter, an RS (or known signal) used for RRM measurement will be referred to as an RRM RS, and a point that performs DL/UL transmission to the UE will be referred to as a transmission and reception point (TRP). Here, the TRP may correspond to a specific physical cell, a plurality of physical cell groups or a specific analog beam.

In addition, in the description of the present invention, the antenna port refers to a virtual antenna element for which the same channel characteristics (e.g., delay profile, Doppler spread, etc.) may be assumed (at least in the same resource block).

In addition, a synchronization signal (SS) refers to a reference signal used for a UE to perform time synchronization for a transmission/reception operation with respect to a specific TRP, and a subframe (SF) refers to a transmission unit with a certain length of time that is repeated, wherein definition of the SF may be varied among numerologies.

The configuration information that a TRP delivers to a UE for RRM measurement through higher-layer signaling or the like is referred to as measurement configuration. The measurement configuration may include a TRP index (to be measured), resource allocation information and sequence information about the RRM RS, and a bandwidth for RRM measurement.

Hereinafter, configurations for RRM measurement applicable to the New RAT system will be described in detail based on the description above.

3.1. Methods for Configuring RRM RS 3.1.1. First Method for Configuring RRM RS

When RRM measurement is performed (for a specific TRP), the UE may not have a separate measurement configuration for the TRP or may not receive the measurement configuration. In this case, the UE may assume transmission of an RRM RS (where the transmitted RRM RS is called Type 1) as one of the following. Alternatively, the base station may transmit an RRM RS for the UE as one of the following.

(1) The UE assumes that the RRM RS is transmitted in a (pre-agreed) frequency resource region in an SF in which the Sync Signal (SS) has been transmitted. In other words, the base station may transmit the RRM RS through a certain frequency resource region within the SF in which the SS has been transmitted. In this case, it is assumed that the numerology of the RRM RS is applied in the same way as that of the SS.

(2) The UE assumes that the RRM RS is transmitted in a (pre-agreed) frequency resource region in an SF implied from the SF in which the SS has been transmitted. In other words, the base station may transmit the RRM RS through a certain frequency resource region within an SF implied from the SF in which the SS has been transmitted.

(3) The UE assumes that the RRM RS is transmitted in a pre-agreed SF and in a (pre-agreed) frequency resource region. In other words, the base station may transmit the RRM RS through a specific frequency resource region in a specific SF. In this case, it is assumed that the default numerology is applied as the numerology of the RRM RS.

Here, the sequence information and the time and frequency resource information about the RRM RS (Type 1) may be determined as a function of a unique ID of a corresponding TRP (that transmits the RRM RS), an analog beam index value and/or the indexes of the time and frequency resources in which the SS is transmitted. In other words, the sequence information and the time/frequency resource information about the RRM RS may be determined as a function of (the unique ID of the corresponding TRP, the analog beam index value), (the unique ID of the corresponding TRP, the indexes of the time/frequency resources in which the SS is transmitted), or (the unique ID of the corresponding TRP, the analog beam index value, and the indexes of the time/frequency resources in which the SS is transmitted).

However, in the foregoing description, the default numerology may be determined according to a frequency band in which the TRP is operated, and it may be assumed that the beam sweeping operation is applied in at least a specific frequency band within a pre-agreed SF.

More specifically, in order for the UE to measure the received power (or xRSRP) of the RRM RS based on the RRM RS, the UE must be aware of the resource region through which the RRM RS is transmitted in advance. In this case, considering that the UE must be capable of performing RRM measurement on the TRPs which may become the targets of handover in addition to the TRP from which the UE is to be provided with a service, RRM RS resources on which the UE may perform RRM measurement even in a case where it is difficult to ensure that the UE receives system information (e.g., a TRP is at a relatively long distance) need to be defined separately.

Accordingly, it may be desirable for the base station to transmit an RRM RS conforming to a pre-agreed numerology on time and frequency resources which may be known at least to the UE.

Accordingly, the UE to which the present invention is applicable must perform at least synchronization with respect to the TRP on which the RRM measurement is to be performed. Therefore, the UE may be configured to expect transmission of an RRM RS in an SF in which the SS has been transmitted or a time period implied by the SF in which the SS has been transmitted. Accordingly, the base station to which the present invention is applicable may transmit the RRM RS in the SF in which the SS has been transmitted or a time period implied by the SF in which the SS has been transmitted.

Considering that an analog beam group may be changed on a symbol-by-symbol basis, which is another feature of the New RAT system, the UE to which the present invention is applicable may measure the received power (or xRSRP) of the RRM RS such that potential analog beam groups that are applicable in a specific TRP are equally reflected.

For example, suppose that the received power of a signal received by UE 1 from specific TRP 1 through analog beam group A is high and the received power of a signal received through analog beam group B is low. If TRP 1 is currently transmitting the RRM RS to UE 2 through analog beam group B, and UE 1 calculates the received power (or xRSRP) of the RRM RS by measuring the received power intensity for a specific RRM RS resource at any SF and symbol positions, only the received power for analog beam group B will be reflected in the measured value, and therefore the received power (or xRSRP) of the RRM RS will be reported to be low. However, in reality, this operation may not be preferable in that high received power may have been guaranteed if TRP 1 transmitted the signal to UE 1 through analog beam group A.

Accordingly, the UE according to the present invention may measure the RRM RS in an SF (or time resource) in which all analog beam groups that a specific TRP can potentially use may be observed. For example, in the New RAT system to which the present invention is applicable, UEs may measure the received power (or xRSRP) of the RRM RS on the assumption that beam sweeping is applied in a pre-agreed SF. Accordingly, in order to measure the RRM based on the RRM RS (type 1) described above, a UE according to the present invention may utilize the SS of FIG. 10, the DM-RS or BRS of the xPBCH or a pre-agreed periodic RS resource.

3.1.2. Second Method for Configuring RRM RS

Unlike the case of the first method for configuring RRM RS described above, when the UE performs RRM measurement (on a specific TRP), there may be a separate measurement configuration for the TRP. In this case, the UE may assume transmission of the RRM RS (where the transmitted RRM RS is called Type 2) as follows.

Specifically, the UE assumes that the RRM RS is transmitted in a specific SF and a specific frequency resource indicated by the measurement configuration. In other words, the base station may transmit the RRM RS through a specific SF and specific frequency resource indicated by the measurement configuration. However, it is assumed that the numerology of the RRM RS is a value set in the measurement configuration.

Here, the sequence information and the time and frequency resource information about the RRM RS (Type 2) may be determined as a function of the unique ID of the corresponding TRP and the analog beam index value, or may be indicated by the measurement configuration.

In addition, the RRM RS (Type 2) may be divided into an RRM RS (Type 2-1) having a periodic transmission opportunity and an RRM RS (Type 2-2) having an aperiodic transmission opportunity.

The second method for configuring the RRM RS proposed by the present invention will be described in detail. As described above, the New RAT system to which the present invention is applicable is intended to flexibly provide various services such as eMBB, mMTC, and URLLC.

Here, the requirements for RRM measurement to be satisfied may differ from service to service. For example, URLLC, where reliability is important, may require faster and more accurate RRM measurement than the other services. In this respect, in the New RAT system to which the present invention is applicable, the capability of supporting RRM measurement specialized for each service provided to the UE is needed.

Accordingly, the present invention proposes a method for receiving, by a UE, configuration of an RRS RS (type 2) through measurement configuration information (information including a transmission resource region (i.e., a time period and a subband) and the applied numerology as information about the RRS RS resources), which is configuration information related to measurement, from a TRP when the UE is connected to at least one TRP.

Herein, the RRM RS (Type 2) may be configured through a higher-layer signal, and Type 2-1 which is periodically transmitted based on the configuration information may be applied as the RRM RS. Alternatively, the RRM RS may be transmitted only when RRM RS transmission according to a specific measurement configuration is indicated through the additionally received dynamic control information (DCI) among the plurality of measurement configurations configured through the higher-layer signal.

In addition, in the first RRM RS configuration method and the second RRM RS configuration method described above, the intra-SF symbol position and the frequency resource allocation scheme for the RRM RS may depend on the RRM RS type. As an example, an RRM RS (Type 1) may be transmitted on a symbol on which the SS has been transmitted in an SF in which the SS has been transmitted. An RRM RS (Type 2) may be transmitted only on some pre-agreed symbols within an SF in which RRM RS transmission is expected.

3.1.3. Third method for configuring RRM RS

When the UE performs RRM measurement (on a specific TRP), the UE may determine whether an RRM RS (Type 1 or Type 2) is actually present in an SF (an SF in which the RRM RS transmission is assumed) using one of the following methods.

(1) The UE assumes that the RRM RS is always present.
(2) The UE assumes that the RRM RS is present if the SF is a DL SF.
(3) The UE assumes that the RRM RS is present if another known signal (e.g., SS) is detected.
(4) The UE determines whether the RRM RS is present by blind detection (BD).
(5) The UE receives an indication of whether an RRM RS is present through dynamic control information (DCI), and determines whether an RRM RS is present based on the indication.
(6) The UE assumes that there is an aperiodic RRM RS in an SF for which aperiodic RRM RS transmission or aperiodic RRM measurement is indicated.

Next, if the UE determines that the RRM RS has been transmitted through the methods described above, the UE may utilize the corresponding RRM RS resource for RRM measurement.

Here, the method of determining whether the RRM RS is present may be applied differently for the RRM RS (Type 1) and the RRM RS (Type 2).

More specifically, considering the dynamic characteristics of data traffic, data traffic on DL and data traffic on UL may be generated at any point in time. In an advanced system, such as the New RAT system to which the present invention is applicable, flexible DL/UL traffic may be considered in order to increase the efficiency of resource utilization. Accordingly, a specific DL may support a flexible DL/UL SF structure which is not fixed to DL or UL.

In this case, the SF in which the UE has expected RRM RS transmission as in the first or second RRM RS configuration method described above may be used not as a DL SF but as a UL SF in reality, and thus the RRM RS may not be transmitted. Therefore, when the flexible DL/UL SF structure is supported, the UE according to the present invention should be capable of determining whether or not the RRM RS is actually transmitted in an SF where RRM RS transmission is expected.

Accordingly, the UE may determine whether the RRM RS is actually transmitted through the various methods described above. For example, if an SF in which RRM RS transmission is expected is actually used as a DL SF, the UE may assume that an RRM RS is transmitted in the SF as described in method (2) above.

3.1.4. Fourth method for configuring RRM RS

When a specific TRP is allowed to transmit an RRM RS by applying one of a plurality of numerologies, the specific TRP may generate an RRM RS sequence (e.g., $[S_0, S_1, \ldots, S_L]$) in the frequency domain based on the default numerology. An RRM RS sequence for a numerology having subcarrier spacing which is 1/N times the subcarrier spacing of the default numerology (where N is a positive integer) may be generated by inserting N−1 samples of zero's between frequency samples of the RRM RS sequence generated based on the default numerology (e.g., $[S_0, 0, \ldots, 0, S_1, 0, \ldots, S_{L-1}, 0, \ldots, 0, S_L]$, i.e., N−1 0's are inserted between $S_k$ and $S_{k+1}$).

Accordingly, an RRM RS sequence generated based on the default numerology may be applied to a numerology having subcarrier spacing which is N times the subcarrier spacing of the default numerology (where N is a positive integer) while maintaining the same subcarrier spacing.

Here, the default numerology may be determined according to the frequency band in which the TRP is operated. In addition, the UE may receive the RRM RS on the assumption of the default numerology for the RRM RS irrespective of the numerology actually applied in the TRP (e.g., the Fast Fourier Transform window section, the sampling rate, and the like may be set on the assumption of the default numerology).

More specifically, in a case where a plurality of numerologies is supported in the New RAT system to which the present invention is applicable, the plurality of numerologies may be supported by applying scaling to subcarriers or symbol lengths considering ease of implementation.

For example, it is assumed that the system band is the same for different numerologies, but the subcarrier spacings are multiples of a subcarrier spacing as in the case of 15 kHz and 30 kHz. In this case, according to the fourth RRM RS configuration method described above, subcarrier spacing of 30 kHz may be assumed as the default numerology, and an RRM RS having L samples on the frequency axis may be defined as $[X_0, X_1, X_2, \ldots, X_{L-1}]$ based on this assumption. Then, an RRM RS for the numerology having subcarrier spacing of 15 kHz may be generated as $[X_0, 0, X_1, 0, X_2, \ldots, 0, X_{L-1}]$ by inserting one sample of 0 (zero) between frequency samples of the RRM RS sequence generated based on the default numerology.

Figure 11:
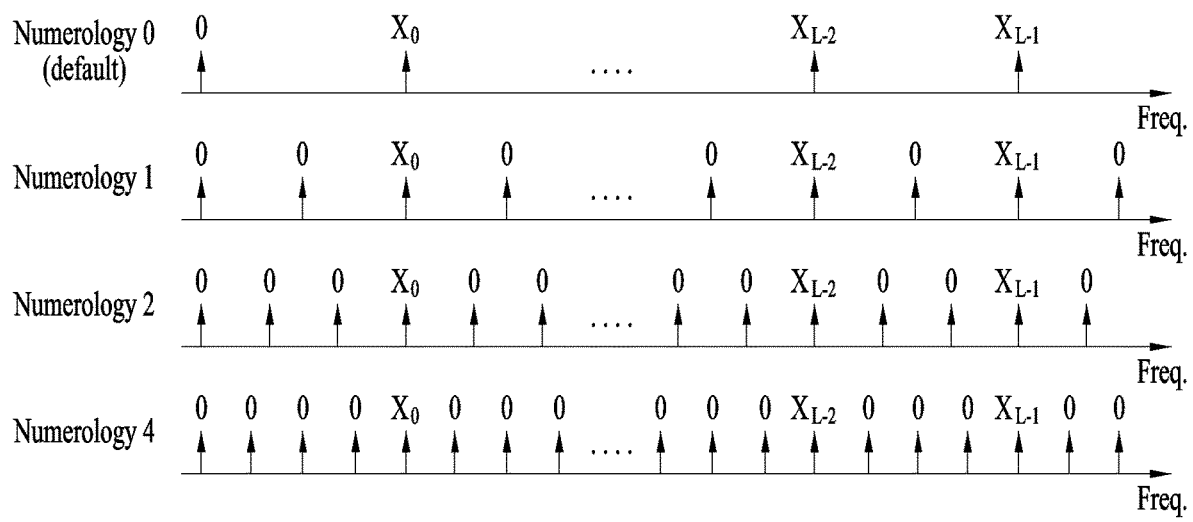
FIG. 11 is a diagram illustrating RRM RSs that can be defined for numerologies having subcarrier spacings which are 1 times, ½ times, ⅓ times, and ¼ times the subcarrier spacing of the default numerology.

FIG. 11 is a diagram illustrating RRM RSs that can be defined for numerologies having subcarrier spacings which are 1 times, ½ times, ⅓ times, and ¼ times the subcarrier spacing of the default numerology.

In FIG. 11, when the subcarrier spacing applied to numerology 0 is 60 kHz, it may be assumed that a subcarrier spacing of 30 kHz is applied to numerology 1, a subcarrier spacing of 20 kHz is applied to numerology 2, and a subcarrier spacing of 15 kHz is applied to numerology 3. As shown in FIG. 11, the RRM RS sequence generated on the basis of the default numerology may be applied even to a numerology having a subcarrier spacing which is N times the subcarrier spacing of the default numerology (wherein N is a positive integer) while maintaining the same subcarrier spacing and the same relative resource positions on the frequency axis in the system band.

In addition, considering Numerology X having subcarrier spacing which is N times the subcarrier spacing of the default numerology, the UE according to the present invention may perform RRM measurement using an RRM RS on the assumption that the RRM RS is transmitted only on a symbol entirely included in a specific symbol in a Numerology X-based SF among the symbols in a default numerology-based SF.

Figure 12:
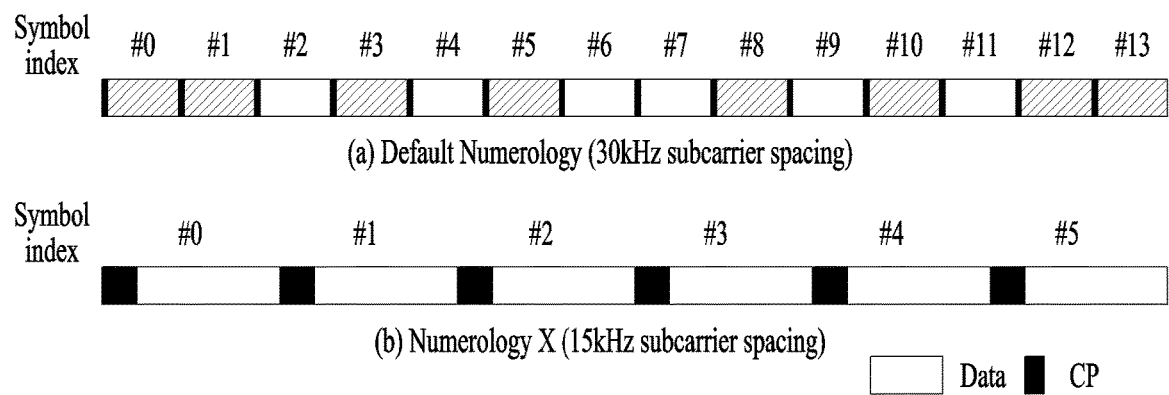
FIG. 12 is a diagram illustrating a case where the subcarrier spacing of the default numerology is 30 kHz and the subcarrier spacing of Numerology X is 15 kHz.

FIG. 12 is a diagram illustrating a case where the subcarrier spacing of the default numerology is 30 kHz and the subcarrier spacing of Numerology X is 15 kHz. Here, as shown in FIG. 12, it is assumed that the symbol configuration in one SF differs from one numerology to another.

When the UE performs RRM measurement on a neighbor TRP, it may be difficult to determine which numerology is currently applied by the corresponding TRP because it is difficult to receive separate information from the corresponding TRP. In this regard, the UE may attempt to receive the RRM RS based on the default numerology, irrespective of the numerology actually used by a TRP, as in the fourth RRM RS configuration method described above.

However, if the FFT window section in which the default numerology is assumed is not completely included in a symbol on which the TRP actually performs transmission, the UE may not properly receive the RRM RS. Therefore, the UE according to the present invention may assume that an RRM RS (conforming to the fourth RRM RS configuration method) is transmitted only on symbols completely included in a specific symbol in an SF defined on the assumption of Numerology X among the symbols in an SF defined on the assumption of the default numerology.

In the example of FIG. 12, Symbols #0 and #1 given when the default numerology is assumed are included in Symbol #0 given when Numerology X is assumed, and therefore the TRP according to the present invention may transmit the RRM RS in Symbols #0 and #1 given when the default numerology is assumed. In response, the UE according to the present invention may assume that the RRM RS conforming to proposed method #4 is transmitted in Symbols #0, #1, #3, #5, #8, #12, and #13 given when the default numerology is assumed.

However, at least the SF (or slot) boundaries for the default numerology and Numerology X (i.e., a numerology with subcarrier spacing which is 1/N times the subcarrier spacing of the default numerology or any other numerology supported by the TRP) may be designed to coincide with each other.

In this case, the base station may notify the UE receiving the data service therefrom, through a higher-layer signal (e.g., RRC signaling) or a dynamic control signal (e.g., DCI), that data rate matching has been applied to the time and frequency resources in which the RRM RS is transmitted or that data rate matching has been applied to (some or all) REs on which the RRM RS is transmitted. In addition, the network may notify UEs to use the RRM RS of the time and frequency resource information about the RRM RS through a higher-layer signal such as RRC signaling. At this time, the information about the numerology applied to the RRM RS may be delivered by applying the default numerology that has generated the RRM RS. A UE that performs RRM measurement using the RRM RS may assume a constantly transmitted RRM RS transmission symbol according to the network configuration information. In reality, if 1/N time numerology is applied and an RRM RS transmission symbol (given when the default numerology is assumed) is repeated N times, the UE may determine whether or not the RRM RS transmission symbols repeated N times are present based on the received power in an RRM RS transmission symbol in which there is always a transmission, and utilize the determination for the RRM RS.

The method described above may be applied not only to the RRM RS but also to a reference signal (RS) or an SS that may be transmitted by applying a plurality of numerologies.

In the first RRM RS configuration method and the fourth RRM RS configuration method described above, a plurality of default numerologies may be defined. In this case, the UE may detect an actually applied default numerology through blind detection, or determine the same through separate system information.

3.1.5. Fifth Method for Configuring RRM RS

If a TRP according to the present invention is capable of transmitting an RRM RS for a maximum of N antenna ports on orthogonal resources for the respective antenna ports, the TRP may apply analog beamforming to the antenna ports of the RRM RS according to one of the following methods:

(1) Apply the same analog beamforming group (or analog beam) to all the antenna ports for the RRM RS;

(2) Apply an independent analog beam for each of the antenna ports for the RRM RS.

Here, the TRP may always allocate frequency resources and sequences of RRM RSs to each antenna port, assuming a maximum number of antenna ports (N) (or a pre-agreed number of antenna ports).

In case of the RRM RS (Type 2), the base station or the TRP may inform the UE of the analog beamforming scheme applied to the RRM RS through measurement configuration.

In addition, when the RRM RS is transmitted in L (L>1) symbols in an SF, the analog beam group (or analog beam) applied to each antenna port may differ from symbol to symbol.

More specifically, considering analog beamforming, which is one of the features of the New RAT system to which the present invention is applicable, how to apply analog beamforming for each antenna port through which the RRM RS is transmitted may raise an issue.

Accordingly, when the UE does not perform RRM measurement on the basis of a single analog beam but performs RRM measurement on the basis of an analog beam group (as in the case of, for example, RRM measurement on a neighbor cell, a neighbor TRP, or the like), the UE may apply the same analog beam group (or analog beam) to all antenna ports for the RRM RS and then measure the RRM RS received power (or xRSRP) using some or all antenna ports for the RRM RS. Specifically, the UE may apply an aggregated analog beam formed by aggregating a plurality of analog beams in specific analog beam group A to the RRM RS for analog beam group A.

In the New RAT system to which the present invention is applicable, at least the SS and xPBCH expected to be received by a UE may be expected to be transmitted by applying all the analog beams in the analog beam group (i.e., through an aggregated analog beam). Thus, according to the present invention, DM-RS resources in the SS or xPBCH may be considered as the resources for xRSRP measurement for each analog beam group.

Alternatively, the base station according to the present invention may instruct the UE to perform RRM measurement for each analog beam. For example, the TRP may instruct the UE to measure RRM RS received power (or xRSRP) for each specific analog beam, using the BRS of FIG. 10. In more general terms, the TRP may transmit the RRM RS for a maximum of N antenna ports on orthogonal resources for each antenna port, and the RRM RS for each antenna port may be transmitted through a specific analog beam.

At this time, in order to enable the UE to utilize the RRM RS transmitted to the plurality of antenna ports in RRM measurement even without additional system information (or configuration information), the TRP may always allocate frequency resources and sequences of the RRM RS to each antenna port, assuming the maximum antenna port number (for example, N). The BRS resources of FIG. 10 may be used as resources for RRM RS received power (or xRSRP) measurement for each analog beam.

3.2. Method for Measuring and Reporting RRM RS Received Power

In this section, a method for measuring and reporting received power using the RRM RS is described for simplicity of explanation, but the elements described below may be extended to any RRM measurement objects.

3.2.1. First Method for Measuring and Reporting RRS RS Received Power

If a specific TRP is capable of transmitting an RRM RS for a maximum of N antenna ports in orthogonal resources for each antenna port, the UE according to the present invention may measure and report RRM RS received power using one of the following methods.

(1) The UE may measure and report the (single) RRM RS received power received through (pre-agreed) specific antenna port(s).

(2) The UE may measure and report the RRM RS received power for each antenna port, assuming the maximum number of antenna ports (e.g., N) (or a pre-agreed number of antenna ports).

Here, the TRP always defines an RRM RS (e.g., BRS) resource (e.g., a frequency-axis resource and a sequence) for each antenna port on the assumption of a maximum number of antenna ports (or a pre-agreed number of antenna ports) for the RRM RS and it is assumed that only the RRM RS (e.g., BRS) resources corresponding to the number of antenna ports which are actually used are allowed for transmission.

More specifically, in the New RAT system to which the present invention is applicable, the RRM RS received power (or xRSRP) measurement method of the UE may be changed depending on the manner in which the TRP applies analog beamforming to the RRM RS. If the UE assumes that an analog beam group (or an aggregated analog beam) is applied to the RRM RS, the UE may measure the RRM RS received power (or xRSRP) using only specific antenna port(s) pre-agreed for the RRM RS.

In measuring the RRM RS received power for each antenna port, the UE may measure the RRM RS received power assuming the maximum number of antenna ports. For example, in supporting BRS transmission in the New RAT system as shown in FIG. 10, an operation in which the UE measures the RRM RS received power (or xRSRP) for each single analog beam using the BRS may be considered.

However, when the UE intends to measure the RRM RS received power (or xRSRP) for a neighbor TRP (or neighbor cell), reception of the system information from the corresponding TRP (or cell) may not be ensured. Accordingly, there may be a case where the UE cannot know the RRM RS (e.g., BRS) information about a specific neighbor TRP (or neighbor cell).

Therefore, in order to address the issue as above, the present invention proposes a method for measuring, by the UE, RRM RS received power (or xRSRP) for each analog beam using an RRM RS (e.g., BRS) even if the UE does not know the RRM RS (e.g., BRS) information about a TRP (or cell) for which the UE intends to measure the RRM RS received power (or xRSRP).

As a simple solution to the aforementioned issue, the TRP may always define an RRM RS (e.g., BRS) resource assuming the maximum number of antenna ports.

Figure 13:
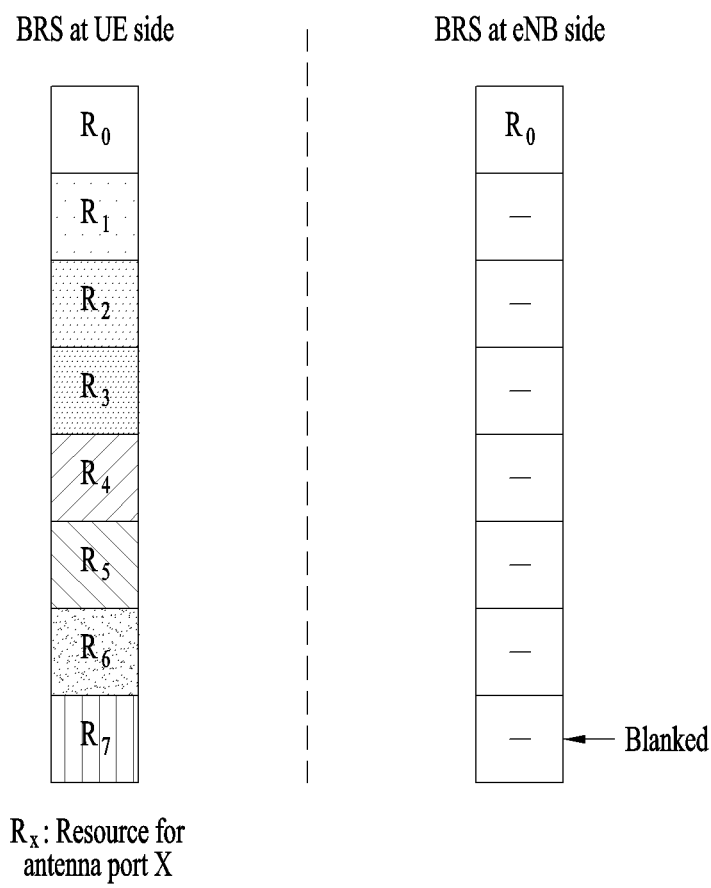
FIG. 13 is a diagram schematically illustrating a BRS for each antenna port from the perspective of a UE or a base station.

FIG. 13 is a diagram schematically illustrating a BRS for each antenna port from the perspective of a UE or a base station.

As shown in FIG. 13, when the number of antenna ports available for actual BRS transmission is one, two, four, or eight, the base station or the TRP may always define BRS resources (e.g., a frequency-axis resource and sequence) for each antenna port which are transmitted every eight REs assuming a maximum of eight antenna ports. Thus, the UE may assume BRS resources for each antenna port as shown in FIG. 13.

In FIG. 13, different sequences may be applied for REs, respectively. At this time, as shown in FIG. 13, the base station may leave a BTS resource for an antenna port not used for actual BRS transmission blank.

If the base station desires to transmit an additional RS for antenna port X in a resource corresponding to another antenna port Y (≠X), it may apply the same analog beam as for antenna port X but use an RRM RS (e.g., BRS) resource (e.g., a frequency resource and sequence) corresponding to antenna port Y.

Figure 14:
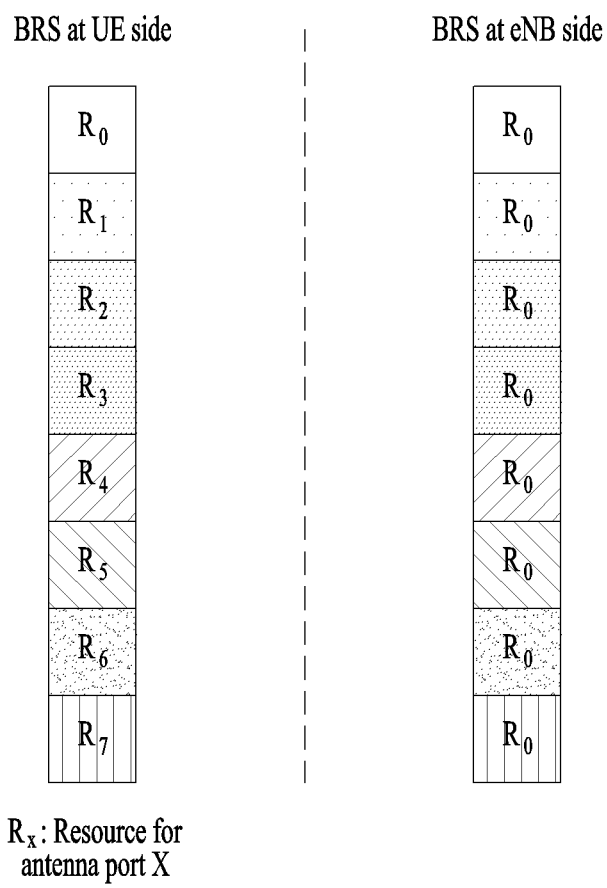
FIG. 14 is a diagram schematically illustrating a configuration for transmitting an additional RS for BRS antenna port 0 in the example of FIG. 13 in resources corresponding to other antenna ports through the same analog beam.

FIG. 14 is a diagram schematically illustrating a configuration for transmitting an additional RS for BRS antenna port 0 in the example of FIG. 13 in resources corresponding to antenna ports 1, 2, 3, . . . , 7 through the same analog beam. In FIG. 14, different patterns for resource elements (REs) mean that different sequences are applied.

When the UE measures the RRM RS received power for each antenna port, the UE may measure the RRM RS received power (or xRSRP) for each RRM RS (e.g., BRS) resource corresponding to each antenna port on the assumption of the maximum number of antenna ports for the RRM RS (e.g., BRS) and report as many RRM RS received power measurement values (or xRSRP) as the maximum number of antenna ports to the base station.

In an exemplary embodiment of the present invention, the operation of the UE measuring the RRM RS received power for each antenna to be applied only when the RRM RS received power (or xRSRP) for a neighbor TRP (or neighbor cell) belonging to a specific TRP group (cell group) (e.g., a cooperative cell group) configured by the serving TRP is measured. At this time, for the neighbor TRPs (or neighbor cells) not belonging to the TRP group (or the cell group), the UE may measure only the RRM RS received power (or xRSRP) received at (pre-agreed) specific antenna port(s).

Here, the RRM RS resources that the UE uses to perform RRM measurement on the serving TRP may be distinguished from the RRM RS resources that the UE uses to perform RRM measurement on the neighbor TRPs. For example, a BRS for which a single analog beam is applicable to each antenna port may be used as an RRM RS in order to perform RRM measurement on the serving TRP, and an SS or a DM-RS of xPBCH to which an analog beam group (or an aggregated analog beam) is applied may be used as an RRM RS in order to perform RRM measurement on a neighbor TRP.

In addition, in measuring the RRM RS received power for each antenna port according to the proposed method, the UE may measure the average RRM RS received power for all symbols in which the RRM RS is transmitted, without differentiating analog beam groups (or analog beams) applied to the respective symbols.

3.2.2. Second Method for Measuring and Reporting RRM RS Received Power

When up to L independent analog beam groups (or analog beams) are allowed to be alternately applied on L symbols in an SF in which a UE will measure RRM RS received power from the perspective of a specific TRP, the UE may measure and report the RRM RS received power using one of the following methods, wherein the one method may be a pre-agreed method or a method indicated by the TRP:

(1) Measure and report RRM RS received power for each combination of (pre-agreed) antenna port(s) and symbol index;

(2) Measure and report RRM RS received power for each combination of antenna port and symbol index assuming a maximum number of antenna ports (or a pre-agreed number of antenna ports).

Herein, if the UE can receive the configuration information about RRM measurement, the TRP may instruct the UE to follow one of the first or second RRM RS received power measurement methods proposed above.

As a concrete example, in the New RAT system applicable to the present invention as in the first RRM RS configuration method described above, the UE may measure RRM RS received power (or xRSRP) by fairly reflecting the analog beam groups potentially usable by a specific TRP (or cell). To this end, the UE may measure RRM RS received power (or xRSRP) in an SF in which the operation of alternately applying analog beam groups applicable by the corresponding TRP (or cell) on each symbol is applied (i.e., an SF in which beam sweeping is applied).

Here, it is assumed that different analog beam groups can be applied on the respective symbols in the SF in which beam sweeping is applied. Then, when the UE measures the RRM RS received power (or xRSRP) on the analog beam group basis, the UE may calculate the average received power of measurement resources for RRM RS received power (or xRSRP) for respective symbols to which the same analog beam group is applied in an SF in which RRM RS received power (or xRSRP) is to be measured. Then, the UE may report the RRM RS received power for each symbol to the serving TRP thereof.

3.2.3. Third Method for Measuring and Reporting RRS RS Received Power

In a case where RRM RS received power is measured with a plurality of RRM RS types configured for a UE, the UE according to the present invention may measure and report the RRM RS received power according to one of the following methods:

(1) Independent measurement and reporting for each RRM RS type;

(2) Applying a weight to a specific RRM RS type while measuring a single value irrespective of the RRM RS type.

Herein, the RRM RS type may refer to a specific RRM RS transmission format defined according to RRM RS transmission resources or sequence or a triggering method for indicating RRM RS transmission. In addition, a weight for a specific RRM RS type may be pre-agreed or may be delivered to the UE through a higher-layer signal or DCI.

As a specific example, suppose that there is an RRM RS (Type 2) configurable by the serving TRP as in the second RRM RS configuration method described above. More specifically, suppose that there are a periodically transmit-table RRM RS (Type 2-1) and an RRM RS (type 2-2), transmission of which is aperiodically instructed by a TRP. In this case, the TRP may instruct the UE to measure and report independent RRM RS received power for each RRM RS type or may instruct the UE to measure and report RRM RS received power of a single value using all RRM RS types configured for the UE.

In the latter case, the UE may assign and apply a higher weight to the RRM RS (type 2-2) in measuring the RRM RS received power, assuming or determining that the RRM RS (type 2-2) is a RRM RS resource exhibiting higher accuracy. Alternatively, as described above, a value indicated by the base station or the TRP may be applied as the weight.

3.3. Method for Measuring and Reporting In-Symbol Received Power

The "in-symbol received power" described in this section may mean the total received power of a signal received within a symbol.

3.3.1. First Method for Measuring and Reporting in-Symbol Received Power

In measuring in-symbol received power (e.g., xRSSI) (for a specific TRP), the UE may measure in-symbol received power (e.g., xRSSI) for each of K analog beam groups (or analog beams) using only a signal to which the corresponding analog beam group (or analog beam) and report RRM information (e.g., an xRSSI value or xRSRQ utilizing xRSSI). In other words, the UE may measure and report a total of K xRSSIs.

However, the UE does not need to accurately know the analog beam groups (or the analog beams), and may measure in-symbol received power (e.g., an xRSSI value or xRSRQ utilizing xRSSI) for time resources (which are pre-agreed or configured through a higher-layer signal) such that the same analog beam group (or analog beam) is applied.

In the New RAT system to which the present invention is applicable, if the UE has a plurality of Rx antennas, the UE may apply an RX (receiver) beamforming technique to transmitted signals. At this time, the RX beam applied by the UE may depend on which analog beam group (or analog beam) is applied, and the interference level experienced by the UE may also depend on the Rx beam. That is, the level of interference experienced by the UE may depend on an analog beam group (or analog beam) applied by the base station.

Accordingly, when the UE intends to measure xRSRQ for each specific analog beam group (or analog beam), the UE may measure xRSRP and xRSSI for each analog beam group (or analog beam). At this time, the UE may measure xRSSI corresponding to each analog beam group (or analog beam) only for a symbol in which the corresponding analog beam group (or analog beam) is applied.

3.3.2. Second Method for Measuring and Reporting In-Symbol Received Power

In measuring in-symbol received power (e.g., xRSSI) (for a specific TRP), the UE calculates an average RX beam based on signals applied (or known) for K analog beam groups (or analog beams). Subsequently, the UE may apply the RX beam to (any) reception symbols to measure in-symbol received power (e.g., xRSSI) for each of the analog beam groups (or analog beams) and report RRM information (e.g., an xRSSI value or xRSRQ utilizing xRSSI). That is, the UE may measure and report a total of K xRSSIs.

Here, as the average RX beam, an RX analog beam applied for reception at the UE side may be applied.

In the case of the first method for measuring and reporting in-symbol received power described above, for a cell for which xRSRQ (or xRSSI) is to be measured, the UE needs to know which analog beam group (or analog beam) is applied for each symbol in which the UE intends to measure xRSSI. However, in the New RAT system in which an analog beam group (or analog beam) is changeable on a symbol-by-symbol basis, knowing which analog beam group (or analog beam) is applied for any symbol may require an excessively high signaling overhead.

Accordingly, as an alternative method for measuring xRSSI according to application of a specific analog beam group (or analog beam), the present invention proposes that the UE calculate an average RX beam for each analog beam group (or analog beam) based on signals (e.g., xPBCH, synchronization signal, BRS) already known about analog beam groups (or analog beams) applied thereto, and apply the RX beam to (any) reception symbols to measure xRSSI for each analog beam group (or analog beam).

In addition, the UE according to the present invention may measure and report the interference intensity after performing cancellation on the RRM RS in a resource in which the RRM RS is transmitted, or may measure and report the interference intensity in a muting resource for which a resource region and a numerology are predetermined.

3.4. Methods for Reporting RRM Measurement Results 3.4.1. First Method for Reporting RRM Measurement Results The TRP may instruct reporting of aperiodic RRM measurement results (e.g., xRSRP or xRSRQ) (for a specific analog beam group or analog beam) over a dynamic control signal (e.g., dynamic control information (DCI), etc.), and the UE receiving the instruction may report the RRM measurement result to the base station over an L1 signal (e.g., a PHY layer signal) or an L2 signal (e.g., a MAC layer signal) at a pre-agreed time.

Here, the TRP may instruct the UE to report an aperiodic RRM RS received power measurement value while indicating a UL resource to the UE through the DCI.

More specifically, in the conventional LTE system, the RRM measurement reporting is performed in a relatively semi-static manner in which the UE reports the measured value of the RRM measurement over a higher-layer signal. On the other hand, in the New RAT system to which the present invention is applicable, since the analog beam group (or analog beam) may be changed on a symbol-by-symbol basis, the UE may be required to quickly report the measured value of an RRM measurement result (e.g., xRSRP or xRSRQ) for the analog beam group (or analog beam). Accordingly, when the UEs report RRM measurement result (e.g., xRSRP or xRSRQ) information about analog beam groups (or analog beams) in a short cycle, the base station may opportunistically apply an analog beam group (or analog beam) proper at the moment based on the information.

As a method for this operation, the base station according to the present invention may instruct reporting of an aperiodic RRM measurement result (e.g., xRSRP or xRSRQ) for a specific analog beam group (or analog beam) through the DCI, and a UE receiving the instruction may report the RRM measurement result (e.g., xRSRP or xRSRQ) to the base station using the L1 signal or the L2 signal after an agreed time from the moment of instruction.

3.4.2. Second Method for Reporting RRM Measurement Results

In the case where the UE measures and reports RRM measurement (e.g., xRSRP, xRSRQ) for each antenna port of an RRM RS (for a specific TRP), the UE may report the RRM measurement result using one of the following methods:

(1) Report the RRM measurement result for each antenna port;

(2) Report the RRM measurement result for (specific) antenna port(s);

(3) Report an averaged RRM measurement result (for antenna ports);

(4) Report the RRM measurement results for each antenna port for M selected (e.g., M best) beams;

(5) Report an averaged RRM measurement result for antenna ports corresponding to M selected (e.g., M best) beams.

Herein, the UE may report the measured RRM value including the TRP index or analog beam index information for RRM measurement.

As a specific example, when the UE is capable of performing RRM measurement for each antenna port of the RRM RS for a specific TRP, the RRM measurement result report on an antenna port where the received power (e.g., xRSRP) of the RRS RS is excessively low may not be useful information from the TRP perspective. Therefore, the TRP may instruct the UE to report RRM measurement results for the M antenna ports with the highest RRM RS received powers (or with the best RRM measurement value in terms of average SINR (signal to interference and noise power ratio)) or pre-agree with the UE about the reporting.

In a further embodiment, when the UE performs RRM measurement for each combination of an antenna port of the RRM RS and a symbol index as in the second method for measuring and reporting RRM RS received power described above, the UE may report the RRM measurement result using one of the following methods:

1) Report RRM measurement results for each combination of an antenna port and a symbol index;

2) Report an RRM measurement results for (specific) combination(s) of an antenna port and a symbol index;

3) Report an RRM measurement result for each averaged symbol index (for antenna ports within the same symbol);

4) Report an RRM measurement result for each averaged antenna port (for the symbols of the same antenna port).

Here, in methods 1), 2) and 3), the UE may report only M RRM measurement results having the highest RRM RS received powers (or best RRM measurement values in terms of average SINR).

3.4.3. Third Method for Reporting RRM Measurement Results

When the UE performs RRM measurement, the UE may determine an RRM measurement target (or a target of the report) using one of the following methods:

(1) All TRPs (satisfying a certain event);

(2) Antenna ports of all RRM RSs (satisfying a certain event);

(3) Some TRPs (satisfying a certain event) (up to M TRPs per time unit);

(4) Some antenna ports (satisfying a certain event) (up to M antenna ports per time unit).

Herein, when the UE reports the RRM measurement value, the UE may report the unique ID information about the measurement target (e.g., TRP ID, RRM RS sequence, antenna port number, etc.) as well.

In addition, when the UE performs RRM measurement for each RRM RS antenna port in the TRP, the target of the RRM measurement result report may be determined according to the first RRM measurement result reporting method described above.

In the New RAT system applicable to the present invention, if each TRP manages a plurality of analog beams and the UE performs RRM measurement for each analog beam, the RRM measurement targets to be measured by the UE may greatly increase in number compared to the conventional LTE system and thus the complexity of the UE may increase. On the other hand, as the RRM measurement results increase, the effectiveness of each RRM measurement result may decrease. Therefore, the UE may be configured to perform only an appropriate level of RRM measurement.

In this respect, when the UE according to the present invention performs RRM measurement (for the antenna ports of a specific TRP group or the RRM RS), the targets on which the RRM measurement is performed may be limited as described in (1) to (4) above.

3.4.4. Fourth Method for Reporting RRM Measurement Results

If the maximum number of measurable RRM measurement targets is defined as the RRM capability of the UE when the UE performs RRM measurement, the UE according to the present invention may report the RRM capability to the base station.

Here, the basic unit of RRM measurement targets may be a TRP, an RRM RS antenna port or an (analog) beam index. In one example, the RRM capability may be defined as the number of TRPs, the number of RRM RS antenna ports or the number of (analog) beam indexes.

In addition, when the UE receives a list of RRM measurement targets according to the measurement configuration from a specific TRP, the UE may perform measurement on up to the maximum number of RRM measurement targets having higher priorities in the list as supported by the RRM capabilities of the UE.

As described in the third RRM measurement result reporting method described above, in the New RAT system applicable to the present invention, if each TRP manages a plurality of analog beams and the UE performs RRM measurement for each analog beam, the RRM measurement targets to be measured by the UE may greatly increase in number compared to the conventional LTE system and thus the complexity of the UE may increase. In this case, the maximum number of supportable RRM measurement targets may be limited according to the implementation of the UE, and this limitation may be defined as a kind of the RRM capability of the UE. The RRM capability may be at least reported to a TRP from which the UE receives a service and be utilized as reference information when the TRP instructs RRM RS (Type 2)-based RRM measurement.

3.5. Additional Features Applicable to the Present Invention

In this section, features additionally applicable to the RRM measurement and reporting method described above will be described in detail.

In the following description, "QCL (quasi-collocated) between two different RS resources" means that a delay spread, a Doppler spread, a Doppler shift, an average gain, an average delay, and arrival/departure angles of a channel which may be derived from one RS resource are applicable to other RS resources as well.

For simplicity of explanation, the report on the reception end analog beam information of the UE is referred to as a beam state information (BSI) report, and a signal through which the UE requests a UL data transmission resource for the BSI report is referred to as a beam state information scheduling request (BSI-SR), and the DL control information through which the base station makes a request to the UE for BSI-SR transmission is referred to as BSI-SR triggering downlink control information (DCI) or a DL beam sweeping indicator. Here, the BSI report may include M (≥1) best beam groups in terms of UE reception, RRM measurement value (e.g., xRSRP, xRSRQ) (measured with the BRS to which the corresponding analog beam is applied) for each best beam.

In the following description, a specific analog beam used to provide a data service to a UE when a base station transmits a DL signal to the UE in the New RAT system to which the present invention is applicable is referred to as a serving beam.

3.5.1. First Additionally Applicable Feature

When a base station configures an aperiodic RRM RS to be transmitted to a UE in a plurality of symbols, the base station may deliver, to the UE, a plurality of pieces of configuration information including the following information about the RRM RS, using a higher-layer signal.

(1) Positions of symbols in which the aperiodic RRM RS is transmitted. Here, the positions of the symbols may be relative position information with respect to a specific symbol (first symbol) in an SF (or TTI) in which the aperiodic RRM RS transmission is triggered.

(2) Analog beam (or analog beam group) information for each aperiodic RRM RS transmission symbol. Herein, as the analog beam (or analog beam group) information, the base station may inform the UE of a resource of a (separately configured) periodic (or periodic transmission opportunity-given) RRM RS (or BRS) which has a QCL relationship and is subjected to the same analog beam (or analog beam group) as the analog beam (or analog beam group) information.

At this time, the base station may inform the UE that an aperiodic RRM RS conforming to specific configuration information among the plurality of pieces of configuration information is transmitted in a specific SF (or TTI), using a dynamic control signal (e.g., DCI).

In addition, the aperiodic RRM RS may be utilized only for a UE in an RRC CONNECTED state which is capable of receiving a higher-layer signal (or a UE that has succeeded in making an initial connection with the base station).

More specifically, in the New RAT system to which the present invention is applicable, evolution of technology for improving energy efficiency of a network as well as a UE is considered. From this point of view, a method to reduce signals transmitted by the base station in the network in an Always On state as much as possible may be considered.

For example, the base station according to the present invention may transmit the aperiodic RRM RS in an on-demand manner in which transmission is performed at a request only when necessary, rather than transmitting the RRM RS at all times. At this time, if the base station is operating hybrid beamforming (or analog beamforming), the aperiodic RRM RS may also be transmitted by applying multiple beams thereto.

In this regard, the present invention proposes a structure in which an aperiodic RRM RS is transmitted for a plurality of symbols in an SF (or TTI) as one form of the aperiodic RRM RS to which multiple beams are applied, and an independent analog beam (or analog beam group) is applied for each symbol. However, the aperiodic RRM RS may be a signal transmitted to a specific UE group rather than a cell-common signal. Accordingly, the analog beams (or analog beam groups) applicable to the aperiodic RRM RS may be some of the analog beams (or analog beam groups) applied to the periodic (or periodic transmission opportunity-given) RRM RS. As one example, if the base station performs transmission of the periodic (or periodic transmission opportunity-given) RRM RS for 14 analog beams, it may perform transmission of the aperiodic RRM RS for only 7 analog beams among the 14 analog beams.

3.5.2. Second Additionally Applicable Feature

A UE according to the present invention may make a request to the base station for (aperiodic) RRM RS resource transmission for analog beam measurement (or RRM measurement), using one of the following methods.

(1) Request (aperiodic) RRM RS resource transmission through a UE-specific UL resource (under a specific condition)

Requesting (aperiodic) RRM RS resource transmission along with its own serving beam information and/or measurement information about the serving beam through a non-UE-specific UL resource (under a specific condition)

Here, the specific condition refers to a condition for determining that analog beam measurement (or RRM measurement) of the UE is needed. As an example of the specific condition, whether or not the link quality (e.g., xRSRP, xRSRQ) for the serving beam is below a certain level, whether or not a certain time has elapsed after configuration of the serving beam may be applied, or the like may be applied.

Considering an energy efficient system as the New RAT system to which the present invention is applicable, an operation may be considered in which the base station manages (or uses) as few periodic RRM RS resources as possible in terms of RRM measurement, and the UE requests additional (aperiodic) RRM RS transmission as necessary.

More specifically, the UE having received confirmation of the serving beam(s) may measure the link quality such as xRSRP or xRSRQ for the serving beam(s). Then, if the link quality drops below a certain level, the UE may make a request to the base station for an (aperiodic) RRM RS resource for new analog beam measurement.

At this time, the UE requesting the (aperiodic) RRM RS resource may inform the base station of the serving beam information configured therefor in order to determine the analog beams for which the base station needs to perform (aperiodic) RRM RS transmission.

Alternatively, if the (aperiodic) RRM RS resource transmission request is transmitted in a UE-specific manner, the base station may recognize the serving beam(s) configured for the UE. For example, the UE may transmit the aperiodic RRM RS resource request in the form of a UL reference signal (RS) supporting multiplexing between a plurality of UEs as a type of scheduling request (SR).

Alternatively, the UE may transmit the (aperiodic) RRM RS resource transmission request to the base station together with the serving beam information thereof in a manner of transmitting UL data.

Upon receiving the (aperiodic) RRM RS transmission request from the UE according to the various methods described above, the base station may or may not perform additional (aperiodic) RRM RS transmission under the determination of the network based on the request information received from multiple UEs.

3.5.3. Third Additionally Applicable Feature

If the base station is to perform analog beam measurement (or RRM measurement) based on a UL RS transmitted by the UE, the UE according to the present invention may transmit the UL RS (for measurement) as follows.

(1) The UE transmits the UL RS (for measurement) through a UL resource about which the UE has pre-agreed (with the network) (under a specific condition).

(2) When the base station instructs the UE to transmit the UL RS (for measurement) (under a specific condition), the UE transmits the UL RS (for measurement) according to the instruction.

Here, the specific condition refers to a condition under which it is determined that analog beam measurement (or RRM measurement) by the UE is needed. As an example of the specific condition, whether or not the link quality (e.g., xRSRP, xRSRQ) for the serving beam is below a certain level, whether or not a certain time has elapsed after configuration of the serving beam may be applied, or the like may be applied.

In addition, the base station may configure whether to perform analog beam measurement (or RRM measurement) based on the UL RS (for measurement) transmitted by the UE for the UE through the system information or a higher-layer signal.

In the New RAT system to which the present invention is applicable, one cell is composed of a plurality of TRPs, and a plurality of analog beams may be managed by each TRP. In this case, when the UE moves within the cell, the serving beam is frequently changed, and analog beam measurement for configuring a new serving beam may be frequently performed. In this case, the analog beam measurement in which the UE measures and reports the DL RS transmitted by the base station may produce a large time delay from the perspective of the UE which moves at high speed. Accordingly, the present invention proposes a scheme in which the UE transmits a UL RS (for measurement) and the network measures the UL RS (for measurement) and configures a serving beam.

In this proposal, transmission of the UL RS (for measurement) may be performed at a time when the UE determines that analog beam configuration is necessary. However, if the UE transmits the UL RS (for measurement) at any point in time, this requires the base station to reserve a large amount of resources for reception of the UL signal. In other words, this operation may not be desirable.

Therefore, transmission of the UL RS (for measurement) may be performed in a UL resource about which the UE has pre-agreed with the network or may be performed at a time indicated by the base station. In the latter case, the UE may first send a request for UL RS transmission (for measurement) or an analog beam measurement (or analog beam measurement resource) request to the base station, and then the base station may instruct the UL RS transmission (for measurement) as needed.

Alternatively, the UE sends its serving beam measurement information through the CSI or the like, and the base station may instruct UL RS transmission (for measurement) based on the information.

The analog beam measurement (or RRM measurement) based on the UL RS (for measurement) transmitted by the UE as described above may be useful only when the number of UEs is significantly smaller than the number of network nodes. In addition, the configuration described above may be established and used only when the base station needs it.

3.5.4. Fourth Additionally Applicable Feature

In the case where the base station according to the present invention performs analog beam measurement (or RRM measurement) based on the UL RS transmitted by the UE, the base station may configure the UL RS (for measurement) as follows:

(1) Configure the UL RS so as to be transmitted in multiple symbols. Here, the UL RS resources (e.g., time and frequency resources, scrambling ID) for each symbol may be configured independently. In addition, analog beams (or analog beam groups) applied symbol by symbol may be configured independently;

(2) Configure the UL RS so as to be repeated in a symbol. Here, the UL RS in the symbol may be generated in an Interleaved Frequency Division Multiple Access (IFDMA) form (or Comb form), and the same sequence may be repeated in one symbol. In addition, the analog beam (or the analog beam group) may be independently configured for each iteration interval (in the symbol);

(3) There may be one or more symbols in which the UL RS is transmitted in combination of (1) and (2), and the UL RS may be configured so as to have a plurality of analog beams (or analog beam groups) (corresponding to the iteration intervals) in each symbol. In this case, the analog beams (or the analog beam groups) may be independently configured on an iteration interval basis in the symbol.

As a specific example, in the case where the base station performs analog beam measurement (or RRM measurement) on the basis of a UL signal transmitted by the UE, the UE may transmit the UL RS signal omni-directionally if possible because this will allow network nodes in various directions to receive the signal. However, if the UE transmits the UL RS (for measurement) using an omnidirectional antenna or the like without applying the analog beams, the coverage area may be shrunk, and thus the network nodes that may listen to the UL RS may be limited.

Accordingly, the present invention proposes a scheme in which a UE transmit the UL RS (for measurement) by applying an analog beam thereto and performs the beam sweeping operation to transmit the UL RS in various directions. In this case, the UL RS may be transmitted through a plurality of symbols while having a different analog beam (or analog beam group) for each symbol, or may be repeated in a symbol while having different analog beams (or analog beam groups) for each iteration interval. In the latter case, UL RS transmission may be performed in a plurality of analog directions while minimizing resource use.

In summary, the UE according to the present invention may perform RRM reporting as follows.

First, the UE receives a signal transmitted by applying one or more analog beams thereto on a symbol-by-symbol basis. Here, the signal includes an RRM reference signal (RS).

Here, the RRM RS may include one or more of a synchronization signal (SS) or a demodulation reference signal in a physical broadcast channel.

In this case, for example, the RRM RS may be transmitted within a frequency resource region of a predetermined size in a subframe in which the synchronization signal (SS) is transmitted, and the same numerology as applied to the SS may be applied to the RRM RS.

As another example, the RRM RS may be transmitted within a frequency resource region of a predetermined size within a subframe after a predetermined number of subframes from a subframe in which the synchronization signal (SS) is transmitted.

As another example, the RRM RS may be transmitted within a frequency resource region of a predetermined size in a predetermined subframe, and a numerology configured by default may be applied to the RRM RS.

As another example, the RRM RS may be generated by inserting one or more samples of zero between the samples of an RRM RS sequence, which is generated based on the numerology configured by default, according to the numerology applied by the base station transmitting the RRM RS, and the UE may receive the RRM RS based on the numerology configured by default.

Subsequently, the UE performs RRM measurement including at least one of received power measurement of the RRM RS and received power measurement for a received signal in a specific symbol based on the received signal, and report the measured RRM information to the base station.

Here, the UE may additionally receive measurement configuration information from the base station. In this case, the RRM RS may be transmitted in a frequency resource region of a predetermined size indicated by the measurement configuration information in a subframe indicated by the measurement configuration information, and a numerology indicated by the measurement configuration information may be applied to the RRM RS.

Alternatively, the RRM RS may be transmitted through one or more antenna ports, and an independent analog beam may be applied to each of the one or more antenna ports.

In this case, different frequency resources and sequences may be allocated to the RRM RSs for the one or more antenna ports. Alternatively, the UE may measure the received powers of the RRM RSs for each antenna port in order to perform received power measurement of the RRM RS.

If the RRM RS is configured by a plurality of types, the UE may independently measure received power of each type of the RRM RS as received power measurement of the RRM RS, or may measure a single value of RRM received power by applying a weight of a certain magnitude to the received power of each type of RRM RS as received power measurement of the RRM RS.

Alternatively, the UE may measure received power for a received signal within a specific symbol for each of the one or more analog beams as received power measurement for the received signal in the specific symbol.

Alternatively, the UE may additionally receive instruction information instructing reporting of an aperiodic RRM measurement result from the base station. Then, the UE may report the measured RRM information to the base station through a physical layer signal or a medium access control (MAC) signal after a predetermined time from the moment at which the instruction information is received.

If the RRM RS is transmitted through one or more antenna ports, the measured RRM information reported by the UE to the base station may include one of RRM measurement result information averaged over the one or more antenna ports, RRM measurement result information per antenna port for a certain number of analog beams of the one or more analog beams, and RRM measurement result information averaged over the antenna ports for a certain number of analog beams of the one or more analog beams.

If the RRM RS is transmitted through one or more antenna ports, the UE may perform RRM measurement on one or more antenna ports satisfying a specific condition, and the measured RRM information may include identification information about the one or more antenna ports satisfying the specific condition.

Alternatively, the UE may additionally report to the base station a maximum number of RRM measurement targets that the UE can measure, and receive measurement configuration information from the base station. At this time, the RRM RS may be transmitted in a frequency resource region of a predetermined size indicated by the measurement configuration information in a subframe indicated by the measurement configuration information, and the UE may perform RRM measurement only on RRM measurement targets corresponding to the maximum number of RRM measurement targets among the RRM measurement targets indicated by an RRM measurement target list included in the measurement configuration information.

Here, the signal may be transmitted by applying one or more independent analog beams to each symbol.

4. Device Configuration

Figure 15:
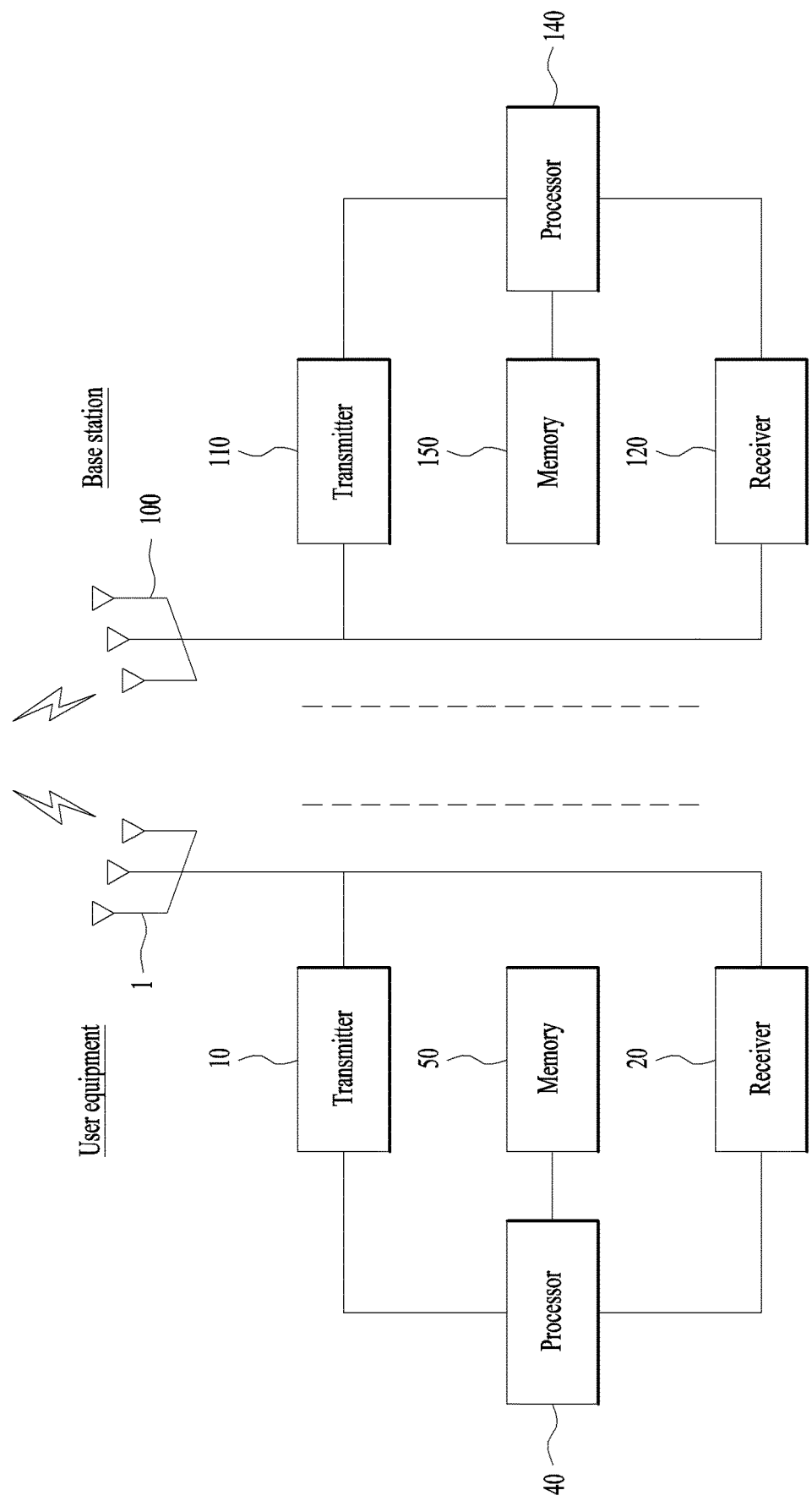
FIG. 15 is a diagram illustrating a configuration of a terminal and a base station in which the proposed embodiments may be implemented.

FIG. 15 is a diagram illustrating configurations of a UE and a base station capable of being implemented by the embodiments proposed in the present invention. The UE shown in FIG. 15 operates to implement the embodiments of the RRM reporting method described above.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 receives configured as above receives, from the base station 100, a signal transmitted by applying one or more analog beams on a symbol-by-symbol basis through the receiver 20. Here, the signal includes an RRM RS. The RRM RS may include a SS or a DM-RS in a PBCH.

Subsequently, the UE 1 performs RRM measurement including at least one of received power measurement of the RRM RS and received power measurement for a received signal in a specific symbol based on the signal (e.g., RRM RS) received from the base station. Then, the UE 1 reports the measured RRM information to the base station 100 through the transmitter 10.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of performing Radio Resource Management (RRM) reporting by a user equipment in a wireless communication system, the method comprising:
    performing RRM measurements; and
    reporting information on the RRM measurements,
    wherein the RRM measurements are performed per beam,
        wherein a RRM measurement among the RRM measurements is performed based on RSs for a same beam, and
    wherein the RSs comprise (i) a synchronization signal (SS) and (ii) a demodulation reference signal for a physical broadcast channel.

2. The method of claim 1, wherein the information comprises the RRM measurements measured by applying a weight having a predetermined magnitude to a certain RRM RS among the RSs.

3. The method of claim 1, further comprising:
    receiving instruction information instructing reporting of an aperiodic RRM measurement result; and
    reporting the information on the RRM measurement through a physical layer signal or a Medium Access Control (MAC) layer signal after a predetermined time from when the instruction information is received.

4. The method of claim 1, wherein the RRM measurements comprises:
    each of reference signal received powers (RSRPs) per beam; and
    each of reference signal received qualitys (RSRQs) per beam.

5. The method of claim 1, wherein the RRM measurements are measured only in one or more symbols in which the RSs are transmitted by applying corresponding beam.

6. A user equipment configured to perform Radio Resource Management (RRM) reporting to a base station in a wireless communication system, the user equipment comprising:
- a transmitter;
- a receiver;
- at least one processor; and
- at least one computer memory operably connectable to the at least one processor and storing instructions that, when executed by the at least one processor, perform operations comprising:
- performing RRM measurements; and
- reporting the information on the RRM measurements,
- wherein the RRM measurements are performed per beam, wherein a RRM measurement among the RRM measurements is performed based on RSs for a same beam, and
- wherein the RSs comprise (i) a synchronization signal (SS) and (ii) a demodulation reference signal for a physical broadcast channel.

7. The user equipment of claim 6, wherein the information comprises the RRM measurements measured by applying a weight having a predetermined magnitude to a certain RRM RS among the RSs.

8. The user equipment of claim 6, wherein the operations further comprise:
- receiving instruction information instructing reporting of an aperiodic RRM measurement result; and
- reporting the information on the RRM measurement through a physical layer signal or a Medium Access Control (MAC) layer signal after a predetermined time from when the instruction information is received.

9. The user equipment of claim 6, wherein the RRM measurements comprises:
- each of reference signal received powers (RSRPs) per beam; and
- each of reference signal received qualitys (RSRQs) per beam.

10. The user equipment of claim 6, wherein the RRM measurements are measured only in one or more symbols in which the RSs are transmitted by applying corresponding beam.

* * * * *